(12) United States Patent
Halasz et al.

(10) Patent No.: US 6,996,714 B1
(45) Date of Patent: Feb. 7, 2006

(54) WIRELESS AUTHENTICATION PROTOCOL

(75) Inventors: David E. Halasz, Stow, OH (US); Glen W. Zorn, Everett, WA (US); Stuart Norman, Don Mills (CA); Douglas Smith, Stouffville (CA)

(73) Assignee: Cisco Technology, Inc., San Jose, CA (US)

(*) Notice: Subject to any disclaimer, the term of this patent is extended or adjusted under 35 U.S.C. 154(b) by 775 days.

(21) Appl. No.: 10/017,544

(22) Filed: Dec. 14, 2001

(51) Int. Cl.
*H04L 9/00* (2006.01)

(52) U.S. Cl. ...................... 713/163; 713/168; 713/182; 713/200; 713/201; 713/171

(58) Field of Classification Search ................ 713/182, 713/168, 171, 163, 200, 201
See application file for complete search history.

(56) References Cited

U.S. PATENT DOCUMENTS 4,658,093 A * 4/1987 Hellman ...................... 705/52
4,995,082 A * 2/1991 Schnorr ...................... 713/169
5,144,667 A * 9/1992 Pogue et al. ................ 348/607
5,721,779 A * 2/1998 Funk .......................... 713/155

* cited by examiner

*Primary Examiner*—Thomas R. Peeso
(74) *Attorney, Agent, or Firm*—Tucker Ellis & West LLP

(57) ABSTRACT

A wireless authentication protocol. Access to a network is managed by providing a challenge-handshake protocol within the Extensible Authentication Protocol for authentication between a client and the network.

47 Claims, 9 Drawing Sheets

WIRELESS AUTHENTICATION PROTOCOL

BACKGROUND OF THE INVENTION

This invention is related to wireless devices operating in accordance with the IEEE 802.11 standard, and more specifically, to a wireless authentication protocol for authenticating such devices.

The conventional Extensible Authentication Protocol (EAP) was originally designed to provide a framework for allowing new authentication methods to be easily introduced into the Point-To-Point Protocol (PPP). Even though EAP was originally designed to operate as part of PPP, it is sufficiently flexible to be mapped to virtually any framed link layer. The IEEE 802.1x EAP over LAN (EAPOL) specification defines a method for encapsulating EAP packets into either Ethernet or Token Ring packets such that the packets may be transmitted over a LAN.

WEP (Wired Equivalent Privacy) protocol security services under the IEEE 802.11 specification provide for data traffic between a wireless client (or peer) and a network access server (NAS) to be encrypted using an encryption key. The WEP protocol uses a key to authenticate each client station. The client station must have a current key to access the network. The NAS, also called an access point (AP), also requires a key to be allowed access to the wireless network. Originally the AP would have a single key, which had to be programmed into each client radio transceiver, and all traffic in the wireless cell would be encrypted with the single key. Now, using EAP authentication, an AP (or equivalently, a centralized Authentication, Authorization, and Accounting (AAA) server) may independently derive a unique session key that is based upon user-specific data. Generation of the particular authentication protocols and key distribution protocols are left to vendors to develop.

The wireless AP often relies on the centralized AAA server to authenticate the clients on its behalf. One of the more popular types of AAA servers is a RADIUS (Remote Authentication Dial-In User Service) server. Extensions to the RADIUS protocol have been defined to allow the transfer of EAP packets between the AAA server and the AP. In this case, the AP is just a relay agent in the authentication conversation that takes place between the wireless client and the RADIUS AAA server. The RADIUS server informs the AP of the result of the client authentication and whether to allow the client to access the network. Other parameters may be returned as well, including session keys for use between the client and the AP.

In the wireless environment, it is very easy for a rogue AP to masquerade as a valid AP, and capture all of the client traffic. Thus the client must be able to make sure it is connecting to the correct network. One way to eliminate this "man-in-the-middle" attack by the rogue AP is to incorporate mutual authentication such that the client verifies the identity of the AP, as well as the AP verifying the client.

Further, the protocol must be efficiently executable. A processor in most wireless transceiver radio cards is fairly simple, must be programmed in assembly language, and runs at a low clock speed compared to current host systems. Thus the protocol must be designed such that the code will fit in the code memory of the radio card. The algorithm must run in a reasonable amount of time so that normal data traffic is not blocked for too long a time, especially during roaming from one AP to another.

In the first implementations of EAP in the wireless LAN world, the authentication method used public key cryptography (PKI—Public Key Infrastructure). This is very compute intensive and is handled on the client side by the host processor of the computer in which the radio card is attached. The only other defined authentication method was too simple and did not provide mutual authentication. In order to provide support for embedded systems, such as printers, and for host machines running operating systems that did not have the support routines to allow the use of the PKI authentication, it was felt a new method was needed that could be embedded into the client radio card firmware. In this way, only very minimal host support was needed, that being to provide a username and password to the radio card.

The new protocol must incorporate ease of integration with RADIUS. Most RADIUS servers consist of a module that handles the actual RADIUS protocol, interfaces with one or more back-end database modules, and performs the actual verification of the client information. The new authentication scheme must be supported by a large number of the database modules. As well, since some form of the username and password information must be passed to the AP for generation of an encryption key, the protocol must take into account the types of information about the user password that the database modules are willing to release.

Thus what is needed is a wireless authentication protocol that resides in the EAP, provides mutual authentication between the network infrastructure and the user, offers secure derivation of random user-specific cryptographic session keys, provides compatibility with existing and widespread network authentication mechanisms (e.g., RADIUS), operates with computational speed, and provides a single sign-on capability that is compatible with popular vendor networking architectures, e.g., by Microsoft™.

SUMMARY OF THE INVENTION

The present invention disclosed and claimed herein, in one aspect thereof, comprises a method of managing access to a network utilizing a wireless authentication protocol. The protocol comprises a challenge-handshake protocol within an Extensible Authentication Protocol for authentication between a client and the network.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

The disclosed wireless authentication protocol utilizes EAP, EAPOL, WEP, RADIUS, resides in the EAP, provides mutual authentication between the network infrastructure and the wireless client, offers secure derivation of random user-specific cryptographic session keys, provides compatibility with existing and widespread network authentication mechanisms (e.g., RADIUS), operates with computational speed, and provides a single sign-on capability that is compatible with popular vendor networking architectures, e.g., by Microsoft™. In that the disclosed wireless authentication protocol resides in EAP, it is hereinafter designated LEAP (Light Extensible Authentication Protocol). Additionally, the disclosed protocol eliminates the need to utilize a public/private key mechanism used in conventional systems. Elimination of the need for the public/private key provides a less computation-intensive protocol requiring less program code that allows the protocol engine to be programmed into smaller electronic components, for example, network interface cards having a variety of form factors.

The LEAP authentication protocol is suitable for use in IEEE 802.11 wireless local area network (WLAN) environments, and is based upon existing IETF (Internet Engineering Task Force) and IEEE (Institute of Electrical and Electronic Engineers, Inc.) standards. Since LEAP rides on top of standard protocols, this helps to provide an element of "future-proofing" for wireless LANs.

In accordance with the above advantages, the LEAP algorithm code is sufficiently small to be included in a wireless radio card. This allows for easy implementation of the protocol in a wide range of systems that support EAP and IEEE 802.1x. LEAP is suitable to run in 802.1x and provides for authentication and key management.

Figure 1A:
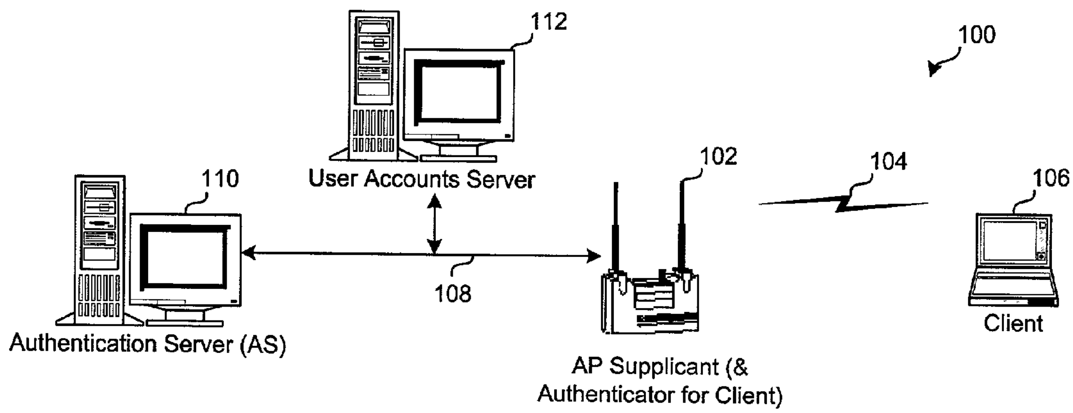
FIG. 1*a* illustrates a general block diagram of a system that utilizes the described LEAP protocol, in accordance with a disclosed embodiment.

Referring now to FIG. 1*a*, there is illustrated a general block diagram of a system that utilizes the described LEAP protocol, in accordance with a disclosed embodiment. A basic system 100 for describing the novel LEAP protocol includes a wireless access point (AP) 102 for communicating over a wireless communication link 104 to a wireless client 106. The AP 102 provides wired network access for the wireless client 106 to a LAN 108 to a centralized authentication server (AS) 110 disposed on the LAN 108 for providing such services. The AS 110 can be configured to run a RADIUS (Remote Authentication Dial-In User Service) protocol for Authentication, Authorization, and Accounting (AAA) services. Note that other types of authentication servers such as DIAMETER can be used. Authentication is a process that determines who is accessing a resource, and almost always comes first. Authorization determines what an authenticated user may do (e.g., assign an IP address), and accounting is logging the actions taken or resources used by the user. The AS 110 provides AAA services to any network entity that can function as an authenticator, for example, the AP 102.

The system 100 also includes a conventional network server 112 having a user accounts database for providing an associated user password to the AS 110 once the username becomes available on the system 100.

Figure 1B:
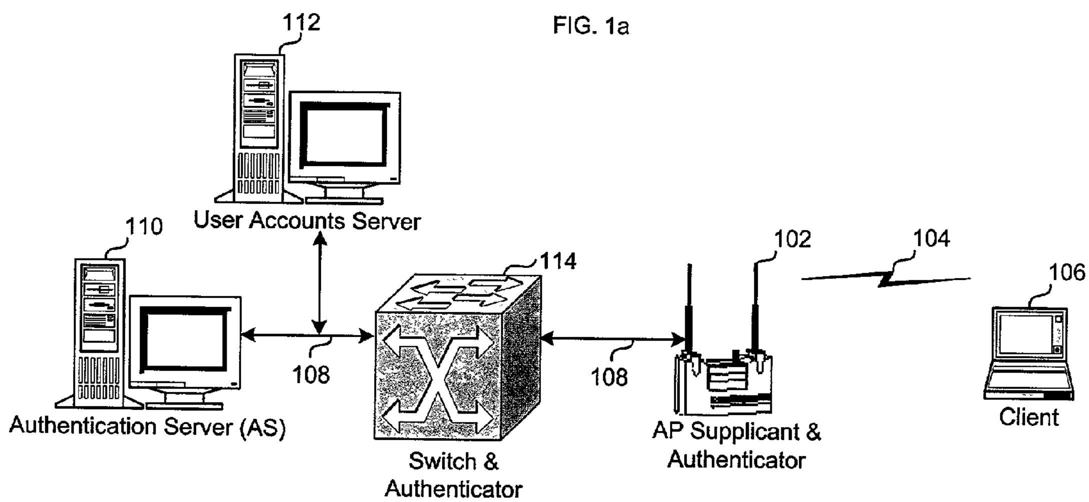
FIG. 1*b* illustrates a general block diagram of an alternative embodiment system utilizing a switch and wireless client according to the described LEAP protocol.

In an optional implementation shown in FIG. 1*b*, a switch 114 is included between the AP 102 and the AS 110 such that packet traffic from the client 106 and AP 102 is transmitted through the switch to the AS 110, and upon the client 106 becoming properly authenticated, to other network services provided by servers disposed on the network 108 (e.g., accounts server 112).

Wireless network environments are open to what is known as the "man-in-the-middle" attack. Thus to substantially reduce the possibility of such an attack, the LEAP algorithm provides for mutual authentication wherein the AS 110 issues a challenge to the client 106 to which a proper response "verifies" to the AS 110 that the client 106 is a trusted entity. In turn, the client 106 issues a corresponding challenge to the AS 110 to which a proper response "verifies" to the client 106 that the AS 110 is a trusted entity, and that the network is that to which the client 106 intended to connect.

IEEE 802.11 supports the use of up to four encryption keys for encrypting traffic between the client 106 and the AP 102. The AP 102 uses one of the key indices for the session key. The session key has a different value for each client/access point connection. Another key is used for the multicast/broadcast traffic sent by the AP 102, and is usually the same for all clients 110 of the AP 102. Eight bytes of random number are transmitted from the AS 110 to the client 106. The mathematical response of the AS 110 to the challenge of the client 106 is not quite the same as the mathematical response of the client 106 to the challenge of the AS 110. However, the mathematical responses of the client 106 and AS 110 are derived from the same user password. Thus both the client 106 and the AS 110 are capable of deriving the anticipated responses of the other during the mutual challenge-response process in order to authenticate one another.

In this particular embodiment, the challenge-response exercise between the AS 110 and the client 106 is based upon a Challenge-Handshake Authentication Protocol (CHAP). There are many different types of CHAP that can be utilized, and the response from the client 106 is, of course, dependent on the CHAP-type utilized by the AS 110. Since most RADIUS servers support MS-CHAP (Microsoft CHAP), this scheme was chosen to be compatible with MS-CHAP RADIUS server databases. MS-CHAP is a Point-to-Point Protocol (PPP) that provides a standard method for transporting multi-protocol datagrams over PPP links. PPP defines an extensible Link Control Protocol and a family of Network Control Protocols for establishing and configuring different network layer protocols. Microsoft's PPP CHAP dialect (i.e., MS-CHAP) extends the user authentication functionality provided on Microsoft Windows™ networks to remote workstations. Microsoft created MS-CHAP to authenticate remote Windows™ workstations, providing the functionality to which LAN-based users are accustomed while integrating the encryption and hashing algorithms used on Windows networks.

The disclosed protocol utilized according to the system 100 consists of a network access server (NAS) authenticator device (i.e., the AP 102 performing an authenticator function for authentication of the client 106) sending a random challenge (on behalf of the AS 110) to the client 106. The client 106 contains a DES (Data Encryption Standard) algorithm that encrypts the challenge to format a response using, in this particular embodiment, an MD4 hash of the user password of the client user attempting to log in and access services on the LAN 108. The client response is then transmitted to the AP 102. The AP 102 forwards the response to the AS 110 for interrogation and authentication. The AS 110 verifies the response using knowledge of the username and password. The username is received from the client 106 during a prerequisite login process for gaining access to the network 108. The AS 110 receives the username, and passes it to the user accounts server 112. The accounts server 112 performs a compare on the accounts database with the username to arrive at the corresponding user password, and transmits the password back to the AS 110 in the form of a single hash of the Unicode format of the user password. Thus the AS 110 never receives the actual user password across the network 108, but receives a hashed version of it. (A hash function H is defined as a transformation that takes an input m and returns a fixed-size string, which is called the hash value h, that is, h=H(m). R. L. Rivest developed the MD4 encryption standard, which is a Damgard/Merkle iterative structure defined in terms of a compression function.)

All communications from the AP 102 to the AS 110 are not encrypted. However, communication over the wireless link 104 between the client 106 and the AP 102 is according to the IEEE 802.11 and 802.1x architecture standards, and can, optionally, be encrypted.

When the wireless client 106 seeks access to the wired LAN 108, the disclosed protocol is utilized to mutually authenticate the client 106 and the network (via the AS 110) whereupon after completion of a successful authentication process, the AP 102 allows "unaltered and unimpeded" packet traffic from the client 106 directly to services of the network 108. (Note that the phrase "unaltered and unimpeded" means that the restructuring of message packets received by the AP 102 from the client 106 normally occurring during the authentication process of the client 106 is no longer required.) During the authentication process, the AP 102 acts as a transparent relay of the conversation between the client 106 and the AS 110.

EAPOL (Extensible Authentication Protocol over LAN) packets from the client 106 have an EAPOL header that is removed and contents added, as an EAP attribute, to a RADIUS Request packet to the AS 110. RADIUS packets from the AS 110 have the EAP attribute contents added to an EAPOL packet and sent to the client 106. The AP 102 never needs to interrogate the contents of the EAP authentication.

To authenticate the client 106, all wireless packet traffic between the client 106 and the AP 102 is structured with LEAP information encapsulated within EAP information, both further encapsulated with IEEE 802.1x or RADIUS. The wireless traffic can further be encapsulated with IEEE 802.11 information. The encapsulated client information is then transmitted over the wireless link 104 to the AP 102 where the client information is then reconstructed for the wired protocol of the network 108. Thus the client information is extracted and re-encapsulated with LEAP, EAP, RADIUS, UDP, and IP in an IEEE 802.3 format. Of course, packet traffic from the AP 102 to the client 106 is then suitably restructured from IEEE 802.3 to IEEE 802.11 traffic utilizing the wireless protocols IEEE 802.11 and 802.1x.

If successfully authenticated, the AS 110 notifies the AP 102 of the successful authentication of the client 106. All future traffic from the client 106 during normal operation of the system 100 then passes through the AP 102 unimpeded and unaltered. Alternatively, if authentication fails, the client 110 is denied access to the services of the network 108. (Note that although the network 108 has been discussed in the context of a LAN, the network may also be a WAN, Intranet, Extranet, etc., communication over which facilitates the challenge-response handshake of the system 100 entities.)

Referring now to FIG. 1*b*, there is illustrated a general block diagram of an alternative embodiment system utilizing a switch 114 and wireless client 106 according to the described LEAP protocol. The switch 114, running the LEAP protocol, is disposed on the network 108 between the AP 102 and the AS 110 to switch packet traffic therebetween. During authentication of the AP 102 (the AP 102 now as a supplicant), the switch 114 functions as authenticator on behalf of the AP 102 to the AS 110. Once the AP 102 becomes authenticated, the switch 114 accepts all future traffic from the AP 102. Similarly, when the client 106 associates to the AP 102, the AP 102 performs an authenticator function on behalf of the client 106 for authentication of the client 106 to the AS 110.

Figure 1C:
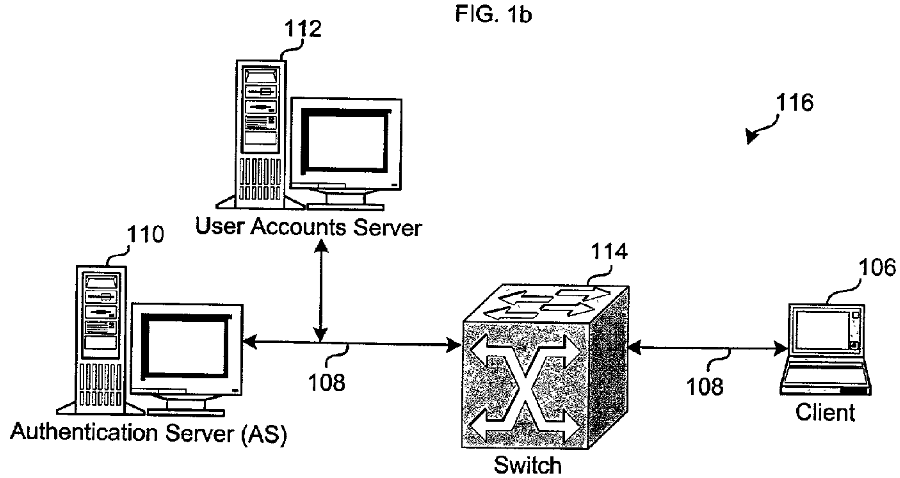
FIG. 1*c* illustrates a general block diagram of an alternative embodiment wired system that utilizes the described protocol.

Referring now to FIG. 1*c*, there is illustrated a general block diagram of an alternative embodiment wired system 116 that utilizes the described protocol. The wired system 116 includes the AS 110, accounts server 112, and switch 114 disposed on the network 108. In this particular embodiment, the AP 102 of FIG. 1*b* is eliminated. The switch 114 is configured to run the LEAP protocol. Since the wired client 106 utilizes a wired connection, no encryption is available between the client 106 and the switch 114.

The client 106 can be easily converted to operate either wirelessly according to FIGS. 1*a* and 1*b*, or in the wired environment of FIG. 1*c* by making the appropriate hardware implementations. The computer 116 must first be authenticated to the AS 110 through the switch 114. When authenticated, the computer 116 acts as a proxy for the authentication process of the wired client 106. As indicated hereinabove, mutual authentication occurs between the client 106 and the AS 110 through the computer 116 and switch 114. The mutual authentication process is described in greater detail hereinbelow.

Figure 2:
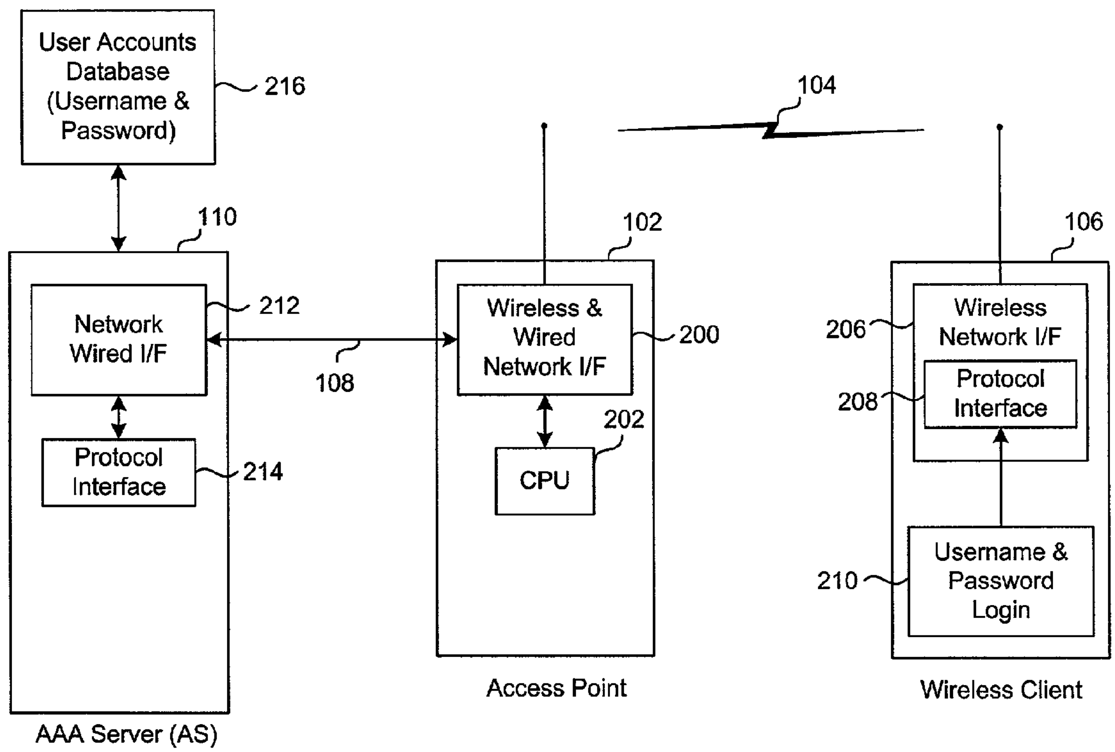
FIG. 2 illustrates a block diagram of general network entities and associated protocol modules of FIG. 1*a;*

Referring now to FIG. 2, there is illustrated a block diagram of general network entities and associated protocol interfaces of FIG. 1*a*. The wired network 108 has disposed thereon the AS 110 and the AP 102. The wireless client 106 communicates with the AP 102 via the communication link 104. Internal to the AP 102 is an AP network interface 200 operatively disposed to provide wireless communication via the link 104 with one or more wireless clients 106 and wired communication via the wired network 108 to network entities, including the AS 110. The wired network 108 is suitably configured for Ethernet and Token Ring architectures, although not limited to such architectures to operate the disclosed LEAP protocol. The AP 102 also contains a central processing unit (CPU) 202 for controlling all functions of the unit.

The client 106 comprises a client wireless network interface 206 for facilitating wireless communication with the AP interface 200 via the AP network interface 200. The client network interface 206 is illustrated including the LEAP protocol algorithm contained within a client protocol interface 208 although it need not be, but can be incorporated into the client 106 in the variety of methods. For example, the client protocol interface 208 can be any conventional nonvolatile firmware (e.g., EEPROM, flash memory, etc.) suitable for providing the access speed required by a system CPU (not shown) of the client 106. Alternatively, the protocol algorithm can be designed into the client CPU such that the illustrated separate protocol interface 208 is not required. Further still, the protocol algorithm can be encoded into a controller (not shown) of the client interface 206 that is easily removable such that the client interface 206 can be replaced or upgraded when desired.

The client 106 also comprises a username and password interface 210 such that a user of the client 106 can enter user information when prompted to do so for authentication purposes. The username and password used for processing of the authentication steps in accordance with the novel protocol can also be the same username and password that the user of the client would utilize in logging-in to a Microsoft network.

The AS 110 includes an AS network interface 212 for communicating over the wired network 108 to the AP 102, during the authentication process which is described in greater detail hereinbelow, and eventually to the client 106. The AS 110 executes the disclosed protocol from an AS 110 protocol interface 214. The AS 110 interfaces to one or more database modules 216 of the remote user account server 112 that contain user names and associated user passwords and hashes thereof. Although the description associates the AS 110 being a RADIUS-type server, the protocol interface 214 is suitably compatible with many non-RADIUS-type servers.

The client 106, as illustrated in FIG. 1*a*, is a portable computer that can roam from cell to cell for use in accessing the wired network 108 via one or more AP units 102. However, the wireless client 106 can also be a printer, fax, copier, desktop computer, or other device that is operable to communicate wirelessly under constraints of the disclosed protocol algorithm.

Figure 3:
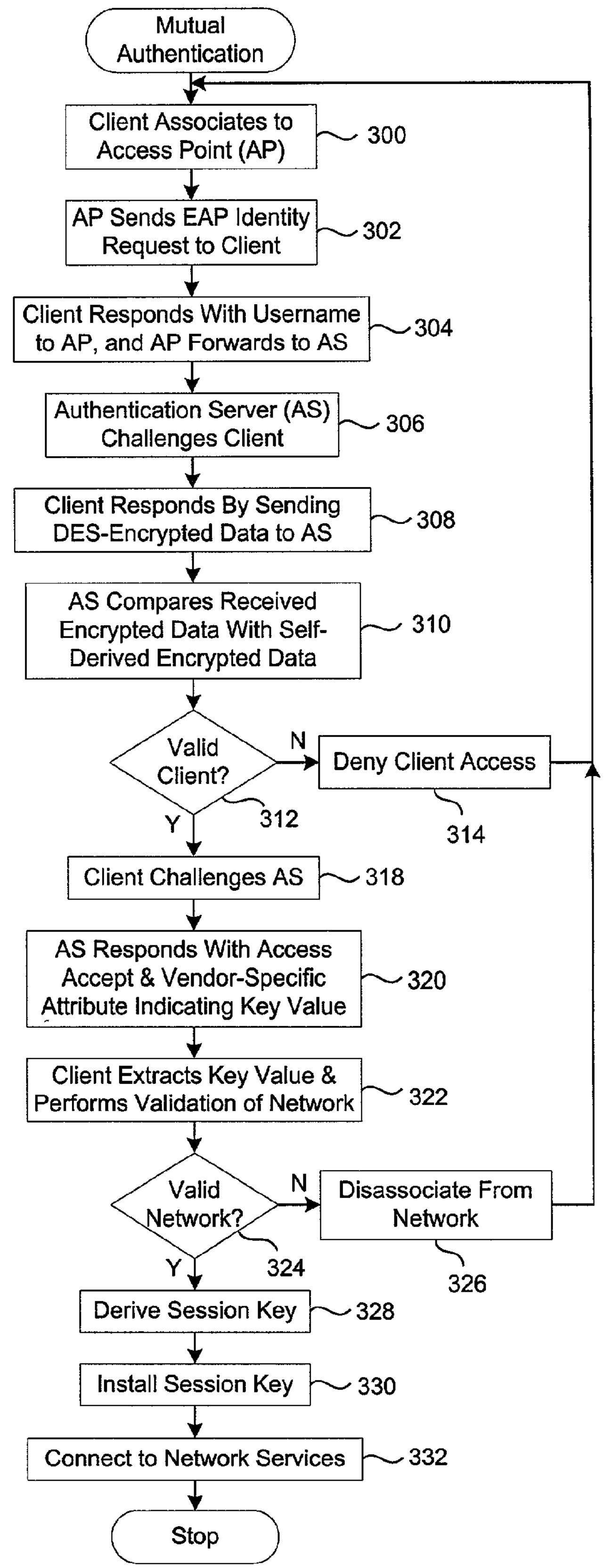
FIG. 3 illustrates a general flow chart of the protocol process for mutual authentication between the wireless client and AS of FIG. 1*a;*

Referring now to FIG. 3, there is illustrated a general flow chart of the protocol process for mutual authentication between the wireless client 106 and AS 110 of FIG. 1*a*. Flow begins at a Start terminal and moves to a function block 300 where the client 106 associates to the AP 102. The AP 102 then sends an EAP identity request to the client 106, as indicated in a function block 302. Flow is to a function block 304 where the username and password of the client user are obtained (e.g., via a login process) in the client 106. The username is transmitted from the client 106 to the AP 102, and forwarded from the AP 102 to the AS 110. The AS 110 then issues a challenge to the client 106, as indicated in a function block 306. In a function block 308, the client 106 responds by performing a DES encryption step, and sending the DES encrypted data to the AS 110. The AS 110 does the same DES encryption based on information corresponding to the received username and checks it against the encrypted response data received from the client 106. Flow is then to a decision block 312 where if the client 106 is not a valid client, flow is out the "N" path to a function block 314 to deny network access to the client 106. Flow then loops back to the input of function block 300 to reinitiate the association process. If the AS 110 determines that the client is valid, flow is out the "Y" path of decision block 312 where the AS 110 notifies the AP 102 that the client is valid, which AP 102 forwards the validation information to the client 106.

In accordance with the mutual authentication aspects of the disclosed LEAP algorithm, the client 106 then initiates a challenge to the AS 110, as indicated in a function block 318. Flow is to a function block 320 where the AS 110 responds with an access-accept, and vendor-specific attribute indicating a key value. This response is forwarded to the client 106 who then performs validation of the network, as indicated in a function block 322. Flow is to a decision block 324, where if the client 106 does not validate the network, flow is out the "N" path to a function block 326 where the client 106 disassociates with the network. Flow then loops back to the input of function block 300 where the client 106 can then be forced to reinitiate the association process.

If the client 106 determines the network to be that which it wants to connect, flow is out the "Y" path of decision block 324 to a function block 328 where a session key is derived. The client installs the session key, as indicated in a function block 330. In a function block 332, the client 106 and the AS 110 have been mutually authenticated, such that the client now gains access to network services disposed on the network 108. The process then reaches a Stop terminal.

Figure 4A:
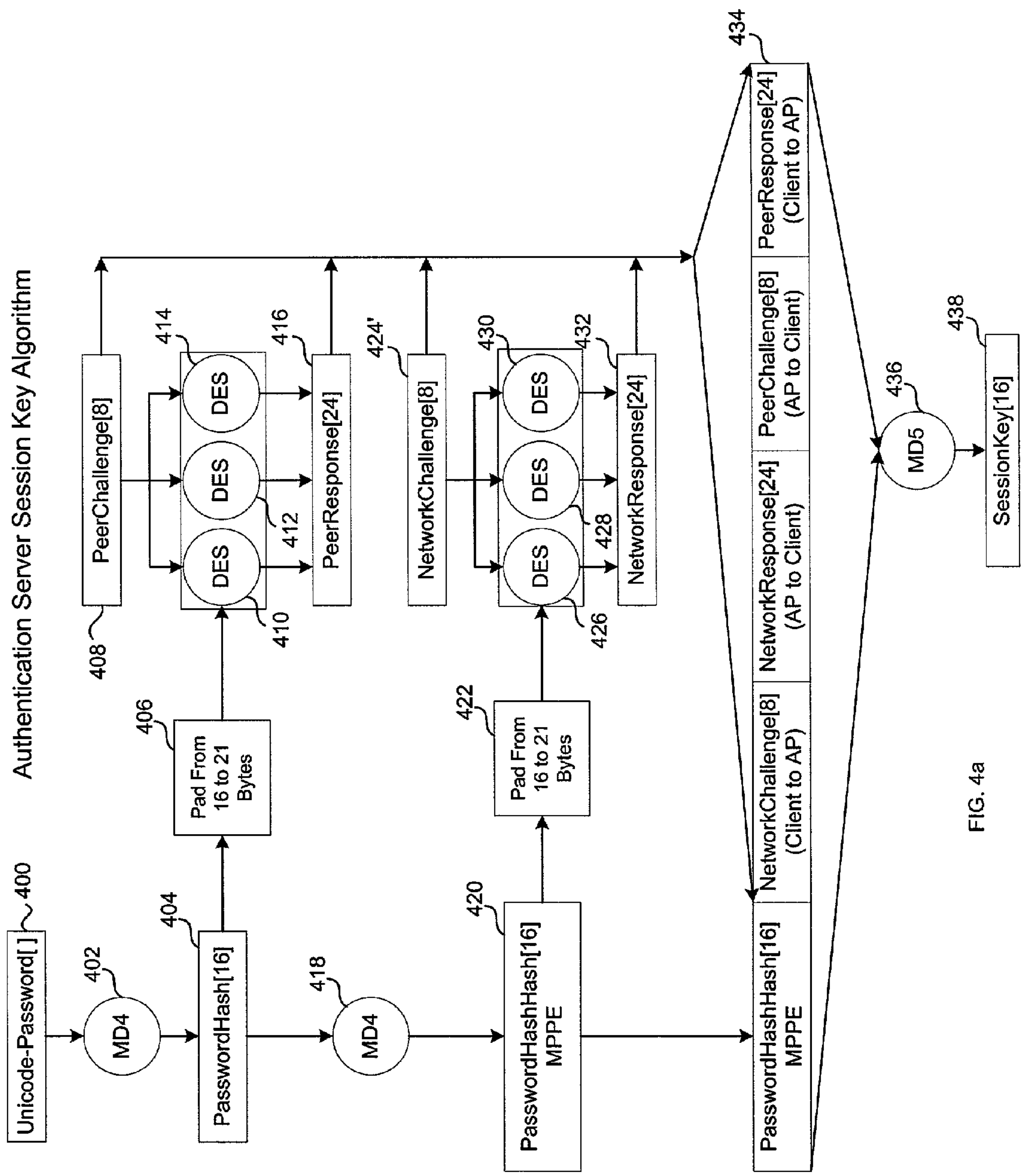
FIGS. 4*a* and 4*b* each illustrate a flow diagram of the LEAP encryption process for deriving a respective session key in the AS and the client, in accordance with a disclosed embodiment.
Figure 4B:
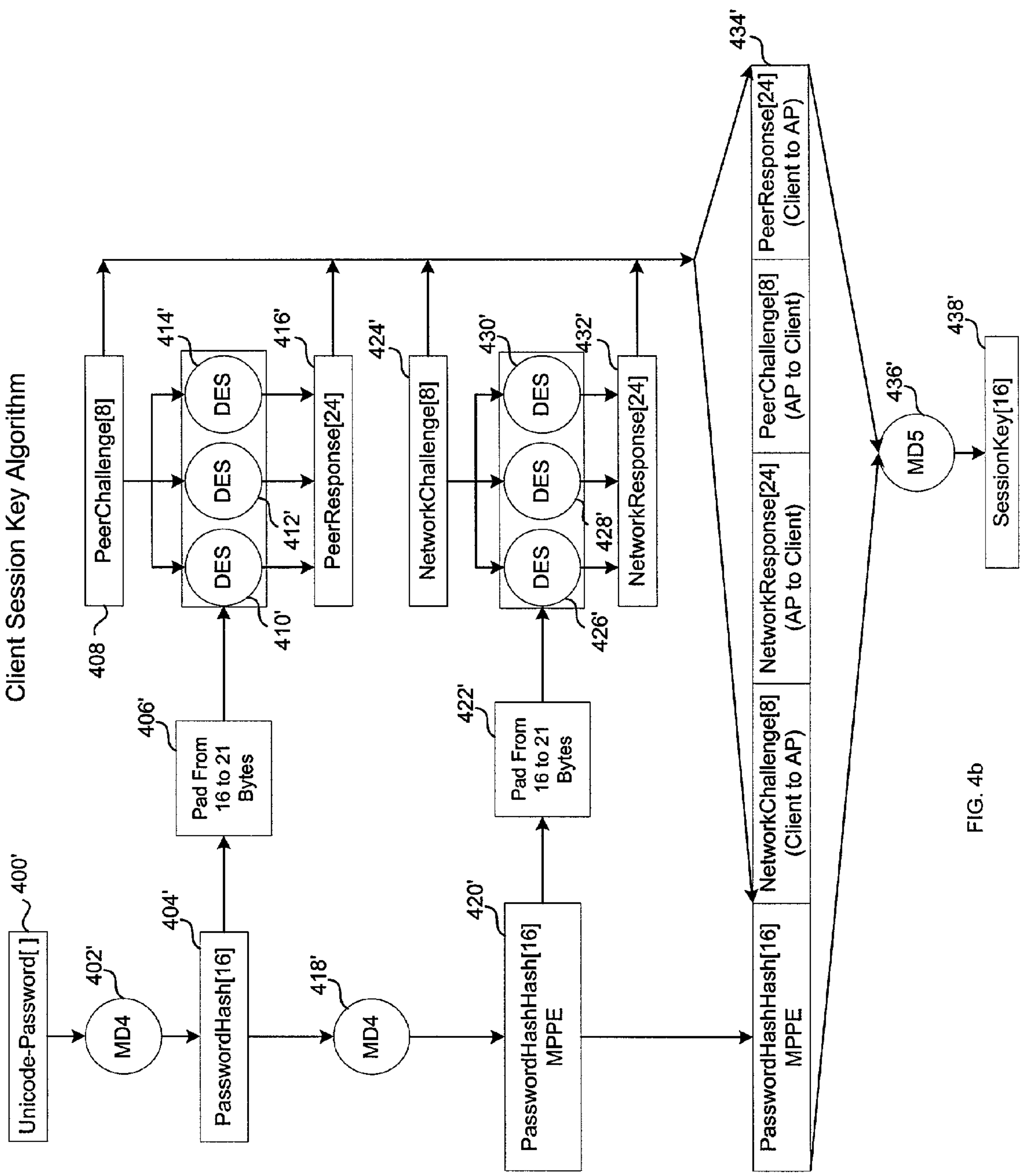

Referring now to FIGS. 4*a* and 4*b*, each illustrate a flow diagram of the LEAP encryption process for deriving a respective session key in the AS 110 and the client 106, in accordance with a disclosed embodiment. The session key algorithm of FIG. 4*a* is utilized in the AS 110, and the identical algorithm of FIG. 4*b* is utilized in the client 106 (the client algorithm numbering denoted with a "'" prime symbol in FIGS. 4*a* and 4*b*, and in the text with an apostrophe "'").

Continuing now with the algorithm of the AS 110 if FIG. 4*a*, the key derivation process begins with a Unicode user password 400 (illustrated as Unicode-Password[ ]). As mentioned hereinabove, the username of the client user is transmitted from the client 106 to the AS 110, and used to find the associated user password in the user accounts database of the user accounts server 112. The user accounts server 112 retrieves the corresponding user password from its accounts database, converts the password to a Unicode format 400, and performs an MD4 digest process 402 on the Unicode password 400. Note that other suitable hash algorithms can be used, for example, MD5. The output of the MD4 hash algorithm block 402 is a 16-byte single-hash password 404 (illustrated as PasswordHash[16]). This single-hash password 404 is transmitted to the AS 110 from the accounts server 112 and utilized as an input to the session key algorithm.

The peer challenge/response portion of the AS key derivation algorithm is utilized in the first half of the mutual authentication process between the AS 110 and the client 106. As part of the network authentication process, the AS 110 generates and sends a peer-challenge word 408 to the client 106. The peer challenge/response portion then splits the single-hash password 404 into multiple subwords (three, in this particular embodiment) of seven bytes each, and uses the subwords as encryption keys in a subsequent encryption process. The three 7-byte keys and a plaintext peer-challenge password 408 (illustrated as PeerChallenge[8]) are used as inputs to a peer DES encryption process to generate an "expected" peer-response word 416. (The significance of the term "expected" is discussed in greater detail hereinbelow.) Since the single-hash password 404 is currently sixteen bytes in length, splitting the single-hash password 404 into three subwords leaves the third subword short of bits to be a 7-byte word. Thus a first padding block 406 pads the third subword of the single-hash password 404 with zeroes to bring the total bytes of the three subword encryption keys to twenty-one bytes.

The 8-byte peer-challenge word 408 sent from the AS 110 via the AP 102 to the client 106 is then encrypted three times utilizing three peer DES encryption processes 410, 412, and 414. That is, the peer-challenge 408 is DES encrypted via the first DES block 410 with the first 56-bit subword of the single-hash password 404, DES encrypted via the second DES block 412 with the second 56-bit subword of single-hash password 404, and the remaining bits of single-hash password 404 are padded with zeroes to create the third 56-bit subword DES key used for encrypting the peer-challenge 408 via the third DES block 414. The resulting outputs of the corresponding DES operations (410, 412, and 414) are then concatenated together to form the 24-byte "expected" peer- response word 416 (illustrated as PeerResponse[24]). The peer-response word 416 is "expected" in that it is calculated in the AS 110 before the actual encrypted peer response word 416' (in FIG. 4*b*, denoted as 416' to indicate generated by the client 106) is received from the client 106. The peer-response word 416' received from the client 106 must be identical to the expected encrypted peer-response word 416 derived by the AS 110. Thus when the client 106 replies with its generated peer-response word 416', the AS 110 compares the expected encrypted peer-response word 416 with the received encrypted peer-response 416' of the client 106 as a validation step for authenticating the client 106. If the comparison fails, the client 106 is prohibited from gaining access to the network.

The network challenge/response portion of the key derivation algorithm of the AS 110 is utilized in the second half of the mutual authentication process between the AS 110 and the client 106. The network challenge/response portion also uses the 16-byte single-hash password 404, but first passes the single-hash password 404 through a second MD4 digest algorithm 418. The resulting output is a 16-byte double-hash password 420 (illustrated as PasswordHashHash[16]). The network challenge/response portion splits the double-hash password 420 into multiple subwords (three, in this particular embodiment) of eight bytes each, and uses the subwords as encryption keys in a subsequent encryption process. The three 7-byte keys and a plaintext network-challenge password 424' (illustrated as PeerChallenge[8]) are used as inputs to a network DES encryption process to generate an network-response word 432. (Note that the network-challenge password 424 is denoted with an apostrophe symbol "'" in text, and prime symbol "′" in the illustration, to indicate that it is received from the client 106.) Since the double-hash password 420 is currently sixteen bytes in length, splitting the double-hash password 420 into three subwords leaves the third subword short of bits to be a 7-byte word. Thus a second padding block 422 pads the third subword of the double-hash password 420 with zeroes to bring the total bytes of the three subword encryption keys to twenty-one bytes.

The 8-byte network-challenge word 424' received from the client 106 is then encrypted three times utilizing three network DES encryption processes 426, 428, and 430. That is, the network-challenge 424' is DES encrypted via the fourth DES block 426 with the first 56-bit subword of the double-hash password 420, DES encrypted via the fifth DES block 428 with the second 56-bit subword of the double-hash password 420, and the remaining bits of double-hash password 420 are padded with zeroes to create the third 56-bit subword DES key used for encrypting the network-challenge 424' via the sixth DES block 430. The resulting outputs of the corresponding DES operations (426, 428, and 430) are then concatenated together to form the 24-byte network-response word 432 (illustrated as NetworkResponse[24]). The network-response word 432 is transmitted to the client 106 for comparison in the client session key algorithm as a validation step for authenticating the AS 110. If the comparison fails, the client 106 deems the AS 110 part of a network to which it does not want to connect, and disassociates.

In the AS 110 session key algorithm, the peer challenge/response words (408 and 416), network challenge/response words (424' and 432), and double-hash password 420 are then used to create an 80-byte intermediate word 434. The intermediate word 434 is an ordered structure of the double-hash password 420 (also called an NT key, in this particular embodiment) concatenated with the LEAP network-challenge word 424' received from the client 106, the LEAP network-response word 432 calculated by the AS 110, the LEAP peer-challenge word 408 from the AS 110, and the peer-response word 416 calculated by the AS 110. The intermediate word 434 is then passed through an MD5 digest algorithm 436 to arrive at a 16-byte AS session key 438 (illustrated as SessionKey[16]).

Note that the AS session key 438 derived by the AS 110 is forwarded to the AP 102 using a shared secret such that the session key 438 is not compromised during transmission over the wired network 108 to the AP 102.

Referring again now to FIG. 4*b*, the session key algorithm in the client 106 performs the same operations performed in the session key algorithm of the AS 110. However, the derived intermediate word 434' of the client 106 is constructed slightly differently. The client intermediate word 434' is the ordered concatenation of the client double-hash password 420', the network-challenge 424' sent from the client 106 to the AS 110, the self-derived network-response 432' of the client 106, the peer-challenge 408 received from the AS 110, and the self-derived peer-response 416'.

More particularly, the user password entered by the client user is converted into a Unicode format 400', and subsequently, an MD4 digest process 402' is performed on the Unicode password 400'. Note that other suitable hash algorithms can be used, for example, MD5. The output of the MD4 hash algorithm block 402' is a 16-byte single-hash password 404' (illustrated as PasswordHash[16]).

The peer challenge/response portion of the client key derivation algorithm is utilized in the first half of the mutual authentication process between the AS 110 and the client 106. The peer challenge/response portion splits the single-hash password 404' into multiple subwords (three, in this particular embodiment) of eight bytes each, and uses the subwords as encryption keys in a subsequent encryption process. The three 7-byte keys and a plaintext peer-challenge password 408 (illustrated as PeerChallenge[8]) are used as inputs to a peer DES encryption process to generate a peer-response word 416'. (Note that the peer-challenge password 408 does not contain the prime symbol since it is received from the AS 110 as part of the opening step of the challenge process between the entities.) Since the single-hash password 404' is currently sixteen bytes in length, splitting the single-hash password 404 into three subwords leaves the third subword short of bits to be a 7-byte word. Thus a first padding block 406' pads the third subword of the single-hash password 404' with zeroes to bring the total bytes of the three subword encryption keys to twenty-one bytes.

The 8-byte peer-challenge word 408 sent from the AS 110 via the AP 102 to the client 106 is then encrypted three times utilizing three peer DES encryption processes 410', 412', and 414'. That is, the received peer-challenge 408 is DES encrypted via the first DES block 410' with the first 56-bit subword of the single-hash password 404', DES encrypted via the second DES block 412' with the second 56-bit subword of single-hash password 404', and the remaining bits of single-hash password 404' are padded with zeroes to create the third 56-bit subword DES key used for encrypting the peer-challenge 408 via the third DES block 414'. The resulting outputs of the corresponding DES operations (410', 412', and 414') are then concatenated together to form the 24-byte peer-response word 416' (illustrated as PeerResponse[24]). The peer-response word 416' transmitted from the client 106 to the AS 110 must be identical to the expected encrypted peer-response word 416 derived by the AS 110. Thus when the client 106 replies to the AS 110 with its generated peer-response word 416', the AS 110 compares the expected encrypted peer-response word 416 with the received encrypted peer-response 416' of the client 106 as a validation step for authenticating the client 106. If the comparison fails, the client 106 is prohibited from gaining access to the network.

The network challenge/response portion of the key derivation algorithm of the client is utilized in the second half of the mutual authentication process between the AS 110 and the client 106. As part of the network authentication process, the client 106 generates and sends a network-challenge word 424' to the AS 110. The network challenge/response portion also uses the 16-byte single-hash password 404', but first passes the single-hash password 404' through a second MD4 digest algorithm 418'. The resulting output is a 16-byte double-hash password 420' (illustrated as PasswordHashHash[16]). The network challenge/response portion splits the double-hash password 420' into multiple subwords (three, in this particular embodiment) of eight bytes each, and uses the subwords as encryption keys in a subsequent encryption process. The three 7-byte keys and a self-generated plaintext network-challenge password 424' (illustrated as PeerChallenge[8]) are used as inputs to a network DES encryption process to generate an "expected" network-response word 432'. Since the double-hash password 420' is currently sixteen bytes in length, splitting the double-hash password 420' into three subwords leaves the third subword short of bits to be a 7-byte word. Thus a second padding block 422' pads the third subword of the double-hash password 420' with zeroes to bring the total bytes of the three subword encryption keys to twenty-one bytes.

The 8-byte network-challenge word 424' is then encrypted three times utilizing three network DES encryption processes 426', 428', and 430'. That is, the network-challenge 424' is DES encrypted via the fourth DES block 426' with the first 56-bit subword of the double-hash password 420', DES encrypted via the fifth DES block 428' with the second 56-bit subword of the double-hash password 420', and the remaining bits of double-hash password 420' are padded with zeroes to create the third 56-bit subword DES key used for encrypting the network-challenge 424' via the sixth DES block 430'. The resulting outputs of the corresponding DES operations (426', 428', and 430') are then concatenated together to form the expected encrypted 24-byte network-response word 432' (illustrated as NetworkResponse[24]). The expected network-response word 432' is used by the client 106 for comparison with the actual network response 432 received from the AS 110 in the client session key algorithm as a validation step for authenticating the AS 110. If the comparison fails, the client 106 deems the AS 110 part of a network to which it does not want to connect, and disassociates.

In the client session key algorithm, the peer challenge/response words (408 and 416'), network challenge/response words (424' and 432'), and double-hash password 420' are then used to create an 80-byte intermediate word 434'. The intermediate word 434' is an ordered structure of the double-hash password 420' (also called an NT key, in this particular embodiment) concatenated with the LEAP network-challenge word 424' transmitted from the client 106, the LEAP expected network-response word 432' calculated by the client 106, the LEAP peer-challenge word 408 received from the AS 110, and the peer-response word 416' calculated by the client 106. The intermediate word 434' is then passed through an MD5 digest algorithm 436' to arrive at a 16-byte client session key 438' (illustrated as SessionKey[16]).

Figure 5A:
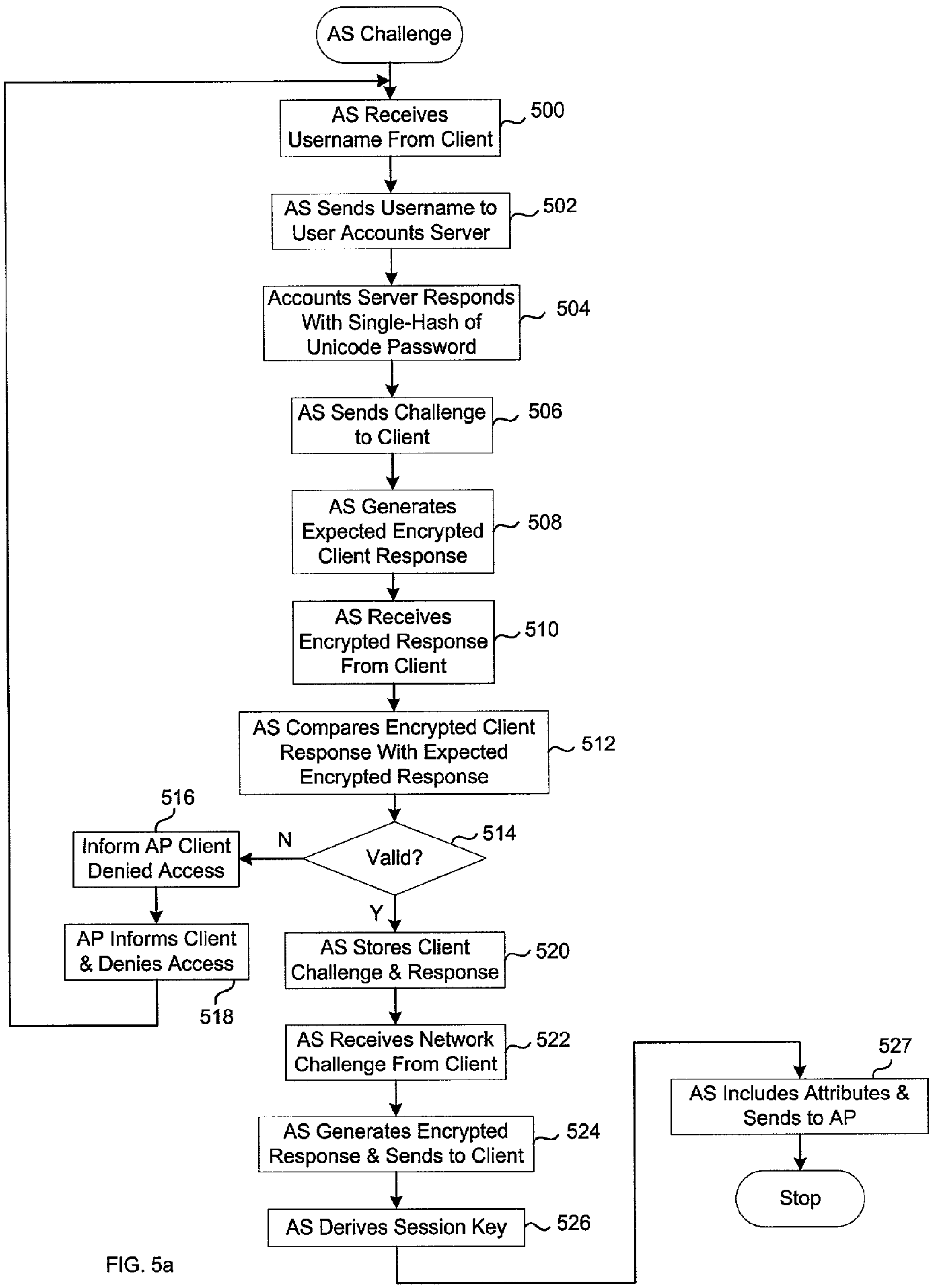
FIG. 5*a* illustrates a detailed flow chart of the challenge/response process from the perspective of the AS, according to a disclosed embodiment.
Figure 5B:
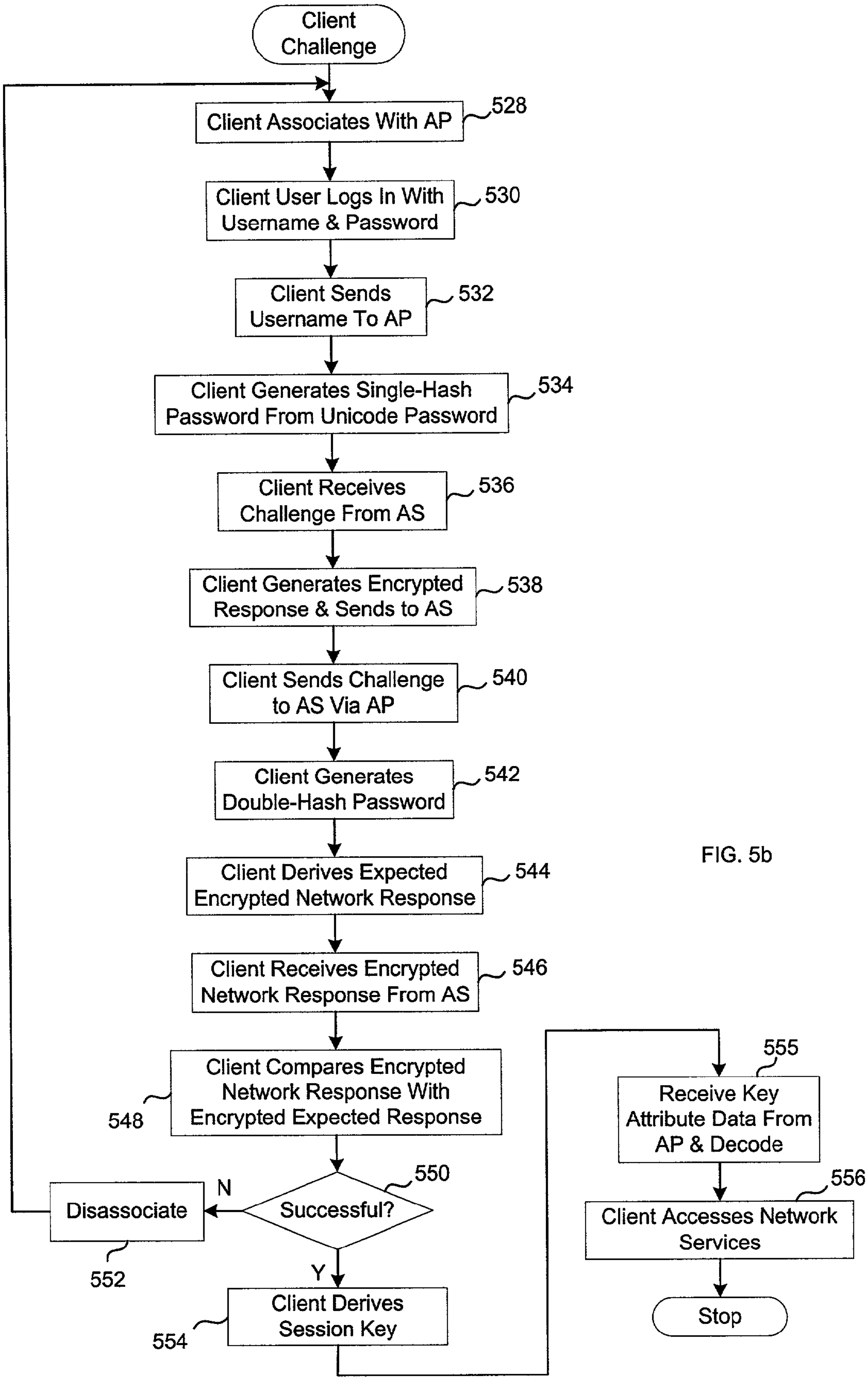
FIG. 5*b* illustrates a detailed flow chart of the challenge/response process from the perspective of the client, according to a disclosed embodiment.

Referring now to FIG. 5*a*, there is illustrated a detailed flow chart of the challenge/response process from the perspective of the AS 110, according to a disclosed embodiment. As described hereinabove, the AS session key 438 is derived from the double-hash password 420 of the user Unicode password 400, the contents of the peer challenge/response (408 and 416) from the AS 110 to the client 106, and the network challenge/response (424' and 432) from the client 106 to the AS 110. IEEE 802.11 encryption may be based on 40-bit WEP keys. Most vendors also implement a 128-bit (really a 104-bit) key. The client and AS key derivation algorithms provide session keys longer than what are needed.

The AS session key 438 and the client session key 438' are not exchanged between the AS 110 and the client 106, since each entity derives its own respective session key. Instead, when the AP 102 receives the AS session key 438 from the AS 110 using the shared secret, the AP 102 sends an EAPOL-KEY message to the client 106 supplying the key length and key index of the AS session key 438 to use in comparison with the client session key 438'. The AS session key 438 is not sent, since the client 106 derives the client session key 438' on its own. The AS EAPOL-KEY message packet is encrypted using the full-length derived AS session key 438. The AP 102 also sends an EAPOL-KEY message supplying the length, key index and value of a multicast key. This EAPOL-KEY message packet is also encrypted using the full-length derived AS session key 438.

The EAP module of the AS 110 may not have access to the plaintext user password of the user accounts server 112 since some back-end databases are unwilling to give up this information. Arguably, the most widely used database 216 is the Microsoft Windows NT™ networking database. The best that can be obtained from this database 216 is a value called the NT key, which is the MD4 hash of the first sixteen bytes of the user Unicode password. Unicode is a universal character standard that uses a double-byte character set containing more than 38,000 characters.

Continuing with the flow chart of FIG. 5*a*, flow begins at a Start terminal and moves to a function block 500 where the AS 110 receives the username of the client user that was transmitted from the client 106 after the user performs a login. Flow is to a function block 502 where the AS 110 then sends the received username to the user accounts server 112. In a function block 504, the accounts server 112 performs a search of the user accounts database 216 to find the associated user password, and as mentioned hereinabove, returns a password that is not the plaintext user password, but a single-hash password 404 that is generated by an MD4 digest 402 of the Unicode version of the password 400. The protocol interface 214 of the AS 110 uses the single-hash password 404 as the basis for generating the AS session key 438.

In a function block 506, the first interactive step of mutual authentication begins by the AS 110 generating and sending a peer-challenge 408 to the client 106, via the AP 102. In the interim, while the AS 110 waits for the client 106 to respond (or at any appropriate time that does not impede the authentication process) to the peer-challenge 408, the protocol interface 214 of the AS 110 generates an expected encrypted peer-response 416, as indicated in a function block 508. As described hereinabove, the expected peer-response 416 is derived by first segmenting the single-hash password 404 into three subwords. Since there are an insufficient number of bits to arrive at three subwords of equal size, the third subword is padded with zeroes in the first padding process 406. These three subwords are used as keys in three separate DES encryption operations (410, 412, and 414) performed on the peer-challenge word 408 to arrive at the expected encrypted peer-response 416.

Flow is to a function block 510 where the AS 110 receives the encrypted peer-response 416' from the client 106. The AS 110 then performs a comparison of the received encrypted peer-response 416' with the self-derived expected encrypted peer- response 416. Flow is to a decision block 514 to determine if the comparison resulted in a valid or authenticated client 106. If not, flow is out the "N" path to a function block 516 where the AS 110 informs the AP 102 of the failed authentication. In a function block 518 the AP 102 informs the client 106 of the failed authentication. At this point, the AS 110 can request the client 106 perform the login operation again, as indicated by flow from function block 518 to the input of function block 500. Alternatively, the AP 102 can simply block any further transmissions from the client 106.

If the client 106 is successfully authenticated, flow is out the "Y" path of decision block 514 to a function block 520 where the AS 110 stores the peer-challenge 408 and self-derived peer-response 416 for later use in generating the AS session key 438. In a function block 522 the AS 110 receives the network-challenge 424' from the client 106. In order to develop the network-response 432 for transmission back to the client 106, in a function block 524, the AS 110 first must generate the double-hash password 420 using a second MD4 digest 418 of the single-hash password 404. Note that the type of digest is not restricted to MD4, but could also be MD5, or other digests, insofar as the digest facilitates rapid execution by the associated processor such that packet blocking of the client 106 is not prohibitive of making the network connection. The second padding operation 422 performs the same type of padding as was performed in the first padding process 406, only on the double-hash password 420. The double-hash password 420 is segmented into three subwords with the third subword requiring zero padding to bring it to the same number of bits as the other two subwords. The three subwords are then used as keys to the three separate network DES operations (426, 428, and 430) on the received network-challenge 424' to arrive at the encrypted network-response 432. The AS 110 sends the derived network-challenge 432 to the client 106.

In a function block 526, the AS 110 now has all the pieces necessary to derive the AS session key 438, and send it to the AP 102 using the shared secret. The intermediate word 434 is formed by the ordered concatenation of the double-hash password 420, followed by the network-challenge 424', followed by the network-response 432, followed by the peer-challenge 408, followed by the self-derived peer-response 416. The intermediate word 434 is then digested using the MD5 hash 436 to arrive at the AS session key 438.

The AS 110 then includes vendor-specific attributes in the session key packet that indicate to the client 106 the encryption key value, and sends the packet to the AP 102, as indicated in a function block 527. When received, the AP 102 extracts the key value and sends an encrypted EAPOL-KEY message to the client 106 that indicates to the client 106 the key length and key index (one of four available) of the AS session key 438. The AP 102 then sends an additional encrypted EAPOL-KEY message to the client 106 indicating the key length, key index, and value of the multicast key. Note that both encrypted EAPOL-KEY messages are encrypted using the full AS session key 438.

Referring now to FIG. **5*b*, there is illustrated a detailed flow chart of the challenge/response process from the perspective of the client 106, according to a disclosed embodiment. The client 106 performs the similar operations on its password, i.e., hashing, padding, and encrypting. Flow begins at a function block 528 where the client 106 associates with the AP 102. The client user then performs a login function that provides his or her username and password, as indicated in a function block 530. In a function block 532, the username is then transmitted from the client 106 to the AS 110, via the AP 102**.

In preparation for deriving the expected encrypted network-response 432, the client protocol interface 208 of the client 106 then performs an MD4 digest 402' of its Unicode password 400' to arrive at the single-hash password 404', as indicated in a function block 534.

In a function block 536, the client 106 receives the peer-challenge 408 from the AS 110. The client 106 must now generate the encrypted peer-response 416'. To do so, the client protocol interface 208 segments the single-hash password 404' into three subwords. The third subword requires more bits to which the first padding process 406' pads zeroes to the third subword to bring it to the same number of bits as each of the other two 7-byte subwords. The padding operation 406' brings the single-hash password 404' to a 24-byte word. The three 7-byte subwords are used as respective keys in the peer DES encryption operations (410', 412', and 414') on the peer-challenge 408 to arrive at the encrypted peer-response 416'. As in the AS 110 protocol interface 214, the client protocol interface 208 includes each of the three DES functions (410', 412', and 414') that operate on the respective 7-byte segments of the padded password. That is to say, the first DES 410' calculation operates on the first 7-byte segment of the padded single-hash password 404' as a first input and the 8-byte received peer-challenge 408 as the second input, the second DES 412' calculation operates on second 7-byte segment of the padded single-hash password 404' as a first input and the 8-byte received peer-challenge 408 as the second input, and the third DES 414' operates on a third 7-byte segment of the padded single-hash password 404' as a first input and the 8-byte received peer-challenge 408 as the second input. Thus the client 106 generates the encrypted peer-response 416', and sends it to the AS 110, as indicated in a function block 538. The client 106 also stores a copy locally for future use in generating its client session key 438'.

In a function block 540, the client 106 sends a network-challenge 424' to the AS 110 via the AP 102. In the interim, or at some point that does not impede the operation, the client 106 generates the double-hash password 420' in preparation for checking the expected encrypted network-response 432' of the AS 110, as indicated in a function block 542. As before with the single-hash password 404', the double-hash password 420' is segmented into three 7-byte subwords, the last of which needs to be zero padded in the second padding process 422' to bring the number of bits equal to each of the other two subwords. Each of the three 7-byte subwords is used as a key in respective network DES encryption processes (426', 428', and 430') on the network-challenge 424' to derive the expected encrypted network-response 432', as indicated in a function block 544. That is to say, the fourth DES 426' calculation operates on the first 7-byte segment of the padded double-hash password 420' as a first input and the 8-byte self-generated network-challenge 424' as the second input, the fifth DES 428' calculation operates on a second 7-byte segment of the padded double-hash password 420' as a first input and the 8-byte self-generated network-challenge 424' as the second input, and the sixth DES 430' operates on a third 7-byte segment of the padded double-hash password 420' as a first input and the 8-byte self-generated network-challenge 430' as the second input.

In a function block 546, the client 106 then receives the encrypted network-response 432 from the AS 110. The client 106 then compares the encrypted network-response 432 with the self-derived expected encrypted network response 432', as indicated in a function block 548. Flow is to a decision block 550 to determine of the comparison was successful. If not, flow is out the "N" path to a function block 552 where the client 106 has determined that the network is that which it does not want to connect, and disassociates therefrom. At this point, flow loops back to the input of function block 528 for the next association to an AP 102.

If the comparison was successful, flow is out the "Y" path of decision block 550 to a function block 554 where the client 106 derives the client session key 438'. Session key derivation in the client protocol interface 208 is accomplished similar to the derivation process performed by the protocol interface 214 of the AS 110. The client 106 now has all the pieces necessary to derive the client session key 438'. The intermediate word 434' is formed by the ordered concatenation of the double-hash password 420' followed by the network-challenge 424', followed by the self-derived expected network-response 432', followed by the peer-challenge 408 received from the AS 110, and followed by the peer-response 416'.

The intermediate word 434' is then digested using the MD5 hash 436' to arrive at the client session key 438'. The client 106 receives the key attribute data, key length and index information from the AP 102, as indicated in a function block 555, and decodes it. After successfully comparing the key length and index information, flow is to a function block 556 where the client 106 has now determined that the network is that which it wants to connect, installs the client session key 438', and accesses the network services disposed thereon. Flow then reaches a Stop terminal.

Figure 6A:
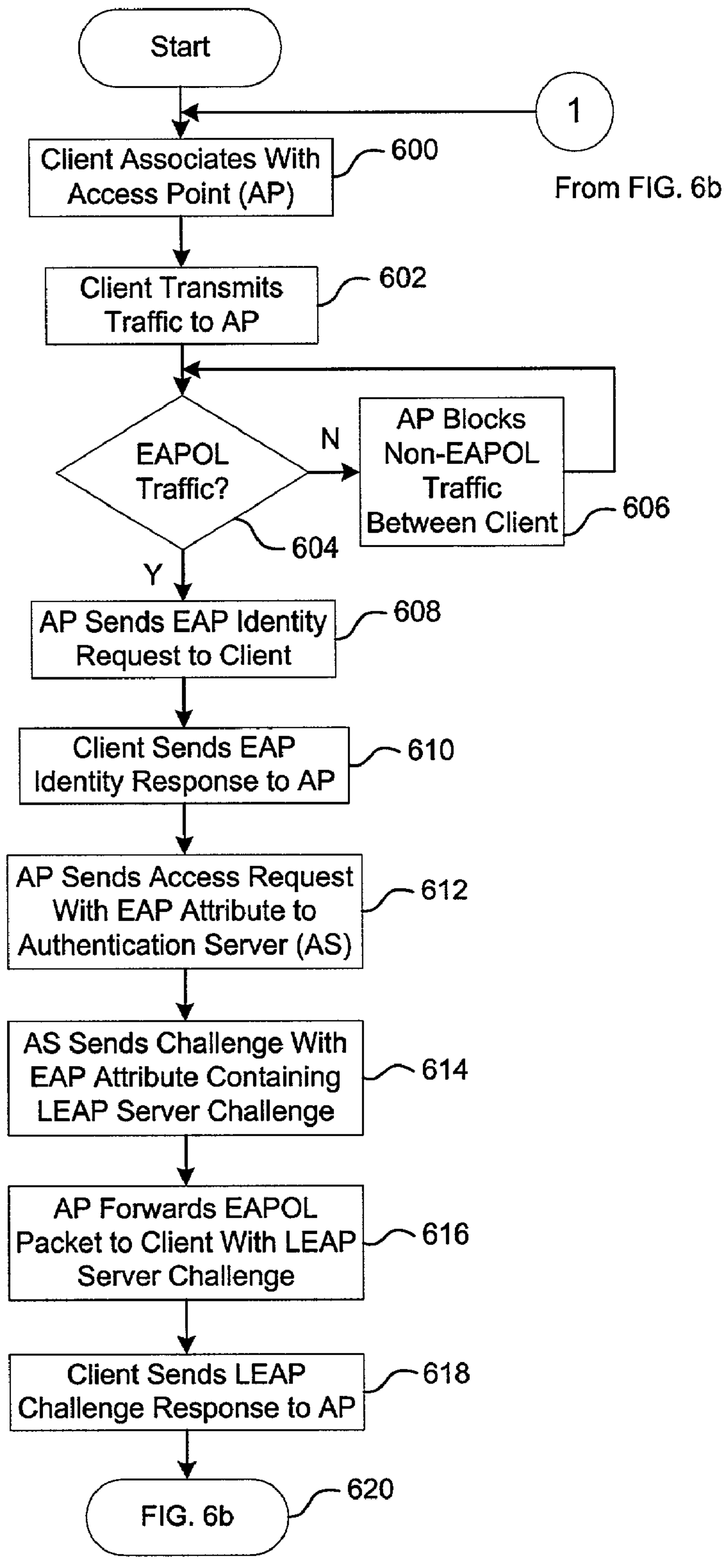
FIGS. 6*a* and 6*b* illustrate a flow chart of the described protocol packet exchange between the authentication server and client, in accordance with a disclosed protocol embodiment.
Figure 6B:
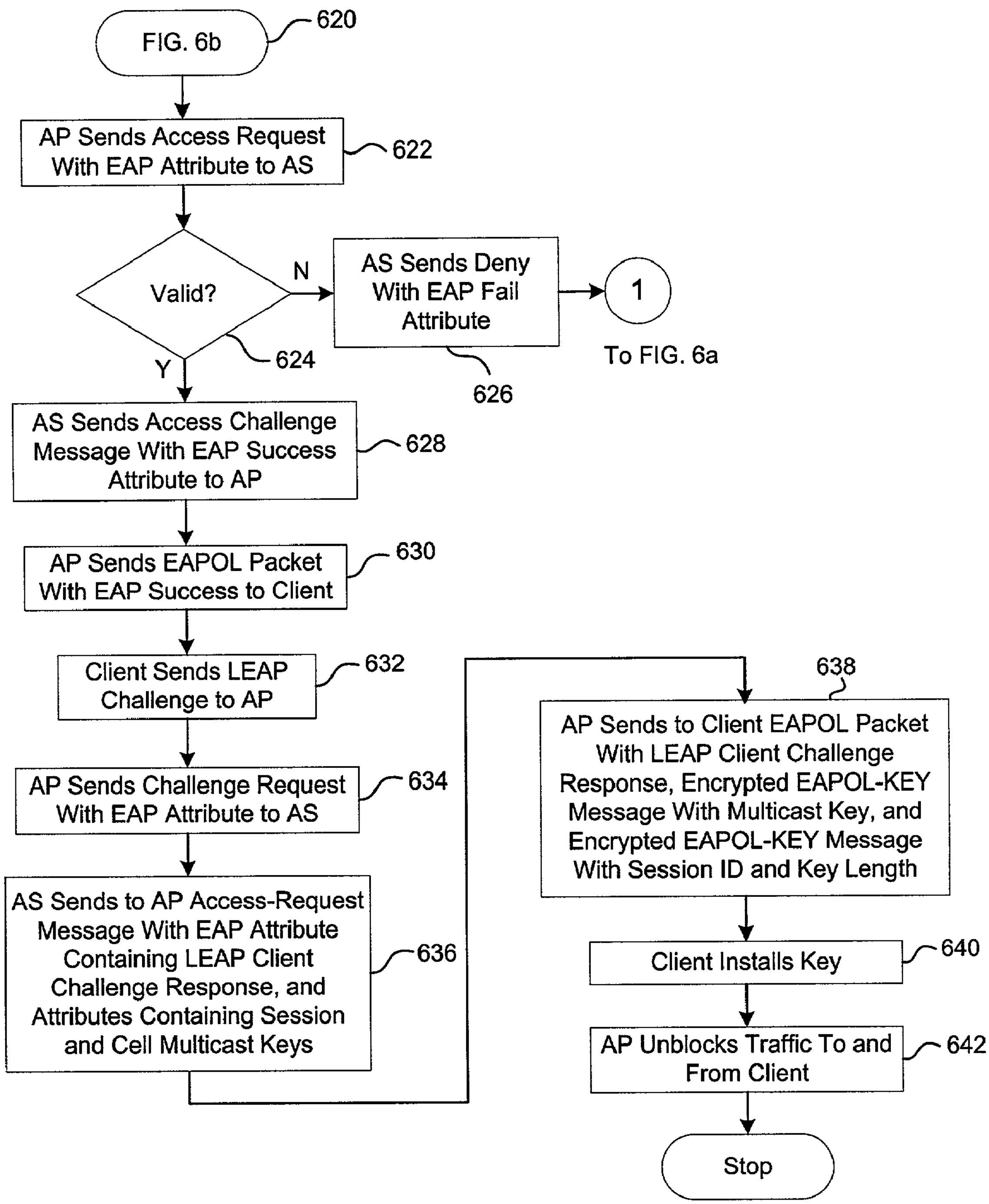

Referring now to FIGS. 6*a* and 6*b*, there is illustrated a flow chart describing protocol packet exchange between the AS 110 and client 106, in accordance with a disclosed protocol embodiment. The flow chart follows a scenario where mutual authentication between the AS 110 and the client 106 is successful. The disclosed novel mutual authentication process includes the client 106 first becoming validly authenticated to the AS 110, and then the client 106 challenging the AS 110 to be sure that the network 108 is that to which it should be connected. Note that the AP 102 is a wireless type of NAS, and that a wired NAS such as the switch 114 can be utilized according to FIG. 1*c*.

Flow begins at a function block 600 where the client 106 "associates" to the AP 102. As a prelude to associating, open and shared-key IEEE 802.11 authentication must first be successfully established. IEEE 802.1x association then commences by the client 106 sending a request packet to the AP 102. The AP 102 responds by sending a response packet to the client 106. The client 106 sends transmissions to the AP 102, as indicated in a function block 602. The AP 102 then determines if received packet traffic is EAPOL traffic, i.e., traffic suitable for seeking access to the wired LAN 108, as indicated in a decision block 604. If the received packet traffic is non-EAPOL traffic, flow is out the "N" path to a function block 606 where the AP 102 blocks any traffic between the client 106 and AP 102. Flow then loops back to the input of decision block 604 to continue monitoring transmissions.

If traffic received from the client 106 is EAPOL traffic, for example, an EAPOL Start message, flow is out the "Y" path of decision block 604 to a function block 608 where the AP 102 begins to perform an authenticator function by transmitting an EAPOL packet with EAP Identity Request message to the client 106. The client 106 responds with an EAP Identity Response message, as indicated in a function block 610. The AP 102 receives the EAP Identity Response packets from the client 106 and restructures the received client packets into an EAPOL format (i.e., RADIUS Access Request with EAP attributes) for forwarding to the AS 110. Flow is to a function block 612 where the AP 102 forwards the client Identity Response packets to the AS 110.

The AS 110 responds to the AP 102 with a Challenge Request message with EAP attribute containing a LEAP server challenge, as indicated in a function block 614. Flow is to a function block 616 where the AP 102 receives and forwards the Challenge Request packets to the client 106. The client 106 responds by sending a LEAP Challenge Response to the AP 102, as indicated in a function block 618. Flow continues to a terminal 620 that links the flow chart of FIG. 6*a* to the flow chart of FIG. 6*b*.

Continuing with FIG. 6*b* from the terminal 620, flow is to a function block 622 where the AP 102 sends the client Access Request to the AS 110 with an EAP attribute. Flow is then to a decision block 624 to determine if the client Access Request is a valid request. If not, flow is out the "N" path to a function block 626 where the AS 110 sends to the AP 102 a deny message having an EAP fail attribute. Flow then loops back to the input of function block 600 (of FIG. 6*a*) to reinitiate the association process.

If the client Access Request is valid, flow is out the "Y" path of decision block 624 to a function block 628 where the AS 110 sends an EAPOL Access Challenge message with EAP success attribute to the AP 102. The AP 102 then forwards the EAPOL packets with EAP success attribute to the client 106, as indicated in a function block 630, indicating that the client 106 has been successfully authenticated.

The client 106 now commences the second half of the mutual authentication process by sending a challenge to the network to be sure that the network is that to which it wants to connect. Since the client 106 is now a trusted client, client packet traffic proceeds unaltered and unimpeded through the AP 102 to the AS 110. (As mentioned hereinabove, mutual authentication is incorporated to substantially reduce the possibility of the man-in-the-middle attack scenario.) The client 106 sends a LEAP Challenge Request to the AS 110 via the AP 102, as indicated in a function block 632. The AP 102 forwards the Challenge Request with EAP attribute to the AS 110, as indicated in a function block 634.

Flow is then to a function block 636 where the AS 110 responds to the client Challenge Request by sending to the AP 102 a RADIUS Access-Accept packet containing an EAP attribute with the LEAP Challenge Response. The packets also contain vendor-specific attributes containing the session and cell multicast keys that inform the AP 102 of the value of the encryption key. Flow is to a function block 638 where the AP 102 forwards the EAPOL packet with LEAP client Challenge Response to the client 106. The AP 102 also sends to the client 106 the EAPOL-KEY with multicast key, and EAPOL-KEY with session ID and key length. The client 106 then verifies the Challenge Response, and if invalid, disassociates. If the AS 110 Challenge Response is valid, flow is to a function block 640 where the client 106 installs the keys. The AP 102 then unblocks all traffic to and from the client 106, as indicated in a function block 642. The process then reaches a Stop terminal.

The following sample routine takes the plaintext Unicode password 400 as input, and outputs the double-hash password key 420.

```
static void
hashpwd( uint8 *pwd, size_t pwdlen, uint8 * hash )
{
      MD4_CTX       md4Context;
      uint8               unicodepwd[256 * 2];
      int                 i;
      memclr( hash, 21 );
      memclr( unicodepwd, sizeof(unicodepwd) );
      for ( i = 0; i < pwdlen; i++ ) {
            unicodepwd[i*2] = *pwd++;
      MD4Init(&md4Context);
      MD4Update(&md4Context, unicodepwd, pwdlen * 2 * 8);
      MD4Final(hash, &md4Context);
      MD4Init(&md4Context);
      MD4Update(&md4Context, hash, 16 * 8);
      MD4Final(hash, &md4Context);
}
```

Packet Formats

The EAPOL packet headers used by LEAP currently follow the 802.1x specification. One aspect not defined in this specification is that in an EAPOL-KEY message, the full-length derived session key is used both to create the packet signature and to encrypt the key value of the multicast key.

The EAP packet headers are as defined in RFC 2284, which is hereby incorporated by reference. EAP is extensible in that EAP request/response types may be defined for new authentication algorithms. The data part of the EAP packet is passed transparently by the EAP protocol routines.

The LEAP uses request/response type 17, a number assigned by IANA (Internet Assigned Numbers Authority). The LEAP Challenge message 424 is an EAP request with the request type set to 17 (for LEAP). Contents of the data section of the packet are provided in the following Table 1.

TABLE 1

LEAP Challenge Packet Data Section

| Size (bytes) | Description | Value |
|---|---|---|
| 1 | Version | 1 |
| 1 | Not Used | 0 |
| 1 | Length of the challenge | 8 |
| 8 | 8 bytes of challenge data | Random |
| N | Username | From EAP Identity Response |

The LEAP Challenge-Response packet 432 is an EAP response with response type set to 17. Contents of the data section of this LEAP packet are provided in the following Table 2.

TABLE 2

LEAP Challenge-Response Packet Data Section

| Size (bytes) | Description | Value |
|---|---|---|
| 1 | Version | 1 |
| 1 | Not Used | 0 |
| 1 | Length of the challenge response | 24 |
| 24 | Challenge response | MS-CHAP hash of challenge and user password |
| N | Username | |

The only non-standard RADIUS attribute used by LEAP is the vendor-specific attribute used to send the session key from the RADIUS server 110 to the AP 102. The AS session key 438 is sent using the vendor-AV pair attribute. The RADIUS attribute is type 26 (for vendor-specific). The vendor ID is suitable for the specific vendor (e.g., ID=9 for Cisco Technologies, Inc.) and the vendor type is 1 (for AV (Attribute-Vendor) pair). The attribute-specific data is provided in the following Table 3.

TABLE 3

Attribute-Specific Data

| Size (bytes) | Description | Value |
|---|---|---|
| 17 | AV pair identifier | "leap:session-key=" |
| 2 | Salt for encrypt routine | Random |
| 1 | Length of key field | 16 |
| 16 | Encrypt of key value | |
| 15 | Padding sub-field | From RFC 2548 |

The key value is encrypted in the same manner as the MS-MPPE-Send-Key attribute, as defined in RFC 2548, which is hereby incorporated by reference.

For security reasons, it is necessary to encrypt certain attributes that are passed between a NAS (e.g., the AP 102) and the AS 110. "Salt-encryption" as discussed in the context of a vendor-specific attribute consists of an attribute of type 26 that contains a vendor ID and vendor-defined information. RADIUS defines a password-hiding mechanism for use with a username-password attribute in an Access Request; namely, that the value of the attribute is XORed with an octet-sequence based on a one-way MD5 digest of the shared secret and the Request Authenticator. Salt-encryption adds a unique two-octet Salt value to each attribute to be encrypted. This Salt would be concatenated with the shared secret and Request Authenticator as input to an MD5 digest to produce an initial 16-byte XOR value that is unique for each encrypted attribute in a RADIUS transaction. The initial and subsequent XOR values are used to encrypt the payload of the attribute. The length of the actual information portion of the attribute may be obfuscated by encoding the payload with the length of the actual data, followed by the data, followed by optional padding.

DETAILED EXAMPLE

The following is a summary of the various hash words of a sample trace in an IEEE 802.1x standard format, and the derivation of which will be discussed in greater detail hereinbelow.

Client user username=dellvira;

Client password associated with username=dellvira;

AP shared secret=secret (for the AS 110);

LEAP client Password=dellvira;

NT Hash=MD4 hash of Unicode password, Unicode password is two bytes for a character instead of one; NT hash of password=4E8612CC8A0558B89283C0580E58C951;

Challenge to client=5E2A842AA64BDD27;

Client response=02C91D9AEC747589239BF3E5EEF8DEFAA1EC8D34C0DB3CE3;

Double MD4 hash of Unicode password=8E9B8CB54E96AD7D762C2B3F263F5EA7;

Challenge to RADIUS server=578FC0651CCAE28E;

RADIUS response=89E2A270F3D0365CE4812BCD11479CB182C2C00436D16723

Session key=MD5 (A cat B cat C cat D cat E), where cat=concatenate,
A=PasswordHashHash[16];
B=ChallengeToRadius[8];
C=ChallengeToRadiusResponse[24];
D=ChallengeToClient[8];
E=ChallengeToClientResponse[24];

Session key=18CA91B6982C44CBDD4A53367CD6A07B;

Authenticator from previous RADIUS Request=9D0310D10B4A43D9679E868405788EF0;

Salt for encrypt routine=2C11;

AP secret with RADIUS server=secret;

Encrypted session key (from AS 110 to AP 102) =78B60C798390BED47954A03B239EAB8AB3F27D8D24CF62CDD289F3D6E991B49D Detailed Trace As indicated hereinabove, the AP 102 operates in an initial state of blocking all non-EAPOL packets to or from the client 106. The detailed session key derivation algorithm begins with the client 106 signaling the AP 102 (also denoted as the NAS or Network Access Server in the following sample trace) with an EAPOL-START message.

```
Client —> NAS (EAPOL-START).
     EAPOL Version:          01
     EAPOL Type:             01 = START
     Length:                 00 00 = 0
     01 01 00 00
********************************************************************************
     The trace continues with the AP 102 responding by sending an EAPOL packet
with an EAP Identity Request message to the client 106.
NAS —> Client (EAPOL: EAP Identity Request).
                                01  00  00  34  01  00  00  34   * ..4...4*
01  00  6e  65  74  77  6f  72  6b  69  64  3d  43  49  53  43   *..networkid=CISC*
4f  2c  6e  61  73  69  64  3d  43  69  73  63  6f  20  53  65   *O,nasid=Cisco Se*
63  75  72  65  20  49  49  2c  70  6f  72  74  69  64  3d  30   *cure II,portid=0*
EAPOL Version:               01
EAPOL Type:                  00 = EAP
Length:                      00 34 = 52 bytes
EAP Contents:
     Code:                   01 = REQUEST
     Identifier:             00
     Length:                 00 34 = 52 bytes
     Type:                   01 = IDENTITY
     Value:                  "networkid=CISCO,nasid=Cisco Secure II,portid=0"
********************************************************************************
     The client 106 then responds to the AP 102 with an EAP Identity Response
message that is the client username of "dellvira".
Client —> NAS (EAP: Identity Response)
01  00  00  0d  02  00  00  0d  01  64  65  6c  6c  76  69  72   *.........dellvir*
61                                                               *a...............*
EAPOL Version:               01
EAPOL Type:                  00 = EAP
Length:                      00 0d = 13 bytes
EAP Contents:
     Code:                   02 = RESPONSE
     Identifier:             00
     Length:                 00 0d = 13 bytes
     Type:                   01 = IDENTITY
     Value:                  "dellvira"
********************************************************************************
     The AP 102 then forwards the received identity response of the client 106 to the
AS 110.
NAS —> RADIUS (Forwarding Identity Response)
                                01  03  00  84  31  91  a0  a3   * ...1...*
a2  44  ce  c8  90  d8  9e  1d  62  84  ff  c0  01  0a  64  65   *.D......b.....de*
6c  6c  76  69  72  61  04  06  c0  a8  82  e4  1e  0e  30  30   *llvira........00*
34  30  39  36  34  37  36  65  63  36  1f  0e  30  30  34  30   *4096476ec6..0040*
39  36  33  35  65  38  65  64  20  11  43  69  73  63  6f  20   *9635e8ed .Cisco *
53  65  63  75  72  65  20  49  49  05  06  00  00  00  1d  0c   *Secure II.......*
06  00  00  05  78  3d  06  00  00  00  13  4f  0f  02  00  00   *....x=.....O....*
0d  01  64  65  6c  6c  76  69  72  61  50  12  0b  bf  bd  d9   *..dellviraP.....*
46  f9  b6  a8  53  7b  85  4c  17  b2  06  e9                   *F...S{.L........*
RADIUS Code:                 01 = REQUEST
Identifier:                  03
Length:                      00 84
Authenticator:               31 91 a0 a3 a2 44 ce c8 90 d8 9e 1d 62 84 ff c0
ATTRIBUTES:
```

-continued

```
    Type:           01 = User-Name
    Length:         0a = 10
    Value:          "dellvira"
    Type:           04 = NAS-IP-Address
    Length:         06 = 6
    Value:          c0 a8 82 e4
    Type:           1e = Called-ID
    Length:         0e = 14
    Value:          "004096476ec6"
    Type:           1f = Calling-ID
    Length:         0e = 14
    Value:          "00409635e8ed"
    Type:           20 = NAS-ID
    Length:         11 = 17
    Value:          "Cisco Secure II"
    Type:           05 = NAS-Port
    Length:         06 = 6
    Value:          1d = 29
    Type:           0c = Framed-MTU
    Length:         06 = 6
    Value:          05 78 = 1400
    Type:           3d = NAS-Port-Type
    Length:         06 = 6
    Value:          00 00 00 13 = Wireless
    Type:           4f = EAP
    Length:         0f = 15
    Value:          EAP CONTENTS
                    Code:           02 = RESPONSE
                    Identifier:     00
                    Length:         00 0d = 13 bytes
                    Type:           01 = IDENTITY
                    Value:          "dellvira"
    Type:           50 = Message Authenticator
    Length:         12 = 18
    Value:          0b bf bd d9 46 f9 b6 a8 53 7b 85 4c 17 b2 06 e9
*****************************************************************************************
```

The AS 110 responds to the AP 102 with a Challenge Request having EAP attributes containing a LEAP server challenge.

RADIUS —> NAS (Challenge Request)

```
                                0b  03  00  3e  60  ff  ce  59  * ..>`..Y*
93  10  fe  2f  0c  22  6c  79  7a  04  4e  7b  50  12  3e  6b  *.../."lyz.N{P.>k*
98  64  b8  a7  37  b2  6b  64  ab  e3  3d  73  28  8a  4f  18  *.d..7.kd..=s(.O.*
01  00  00  16  11  01  00  08  5e  2a  84  2a  a6  4b  dd  27  *........^*.*.K.'*
6c  6c  76  69  72  61                                          *llvira..........*
RADIUS Code:        0b = CHALLENGE
Identifier:         03
Length:             00 3e
Authenticator:      60 ff ce 59 93 10 fe 2f 0c 22 6c 79 7a 04 4e 7b
ATTRIBUTES:
    Type:           50 = Message Authenticator
    Length:         12 = 18
    Value:          3e 6b 98 64 b8 a7 37 b2 6b 64 ab e3 3d 73 28 8a
    Type:           4f = EAP
    Length:         18 = 24
    Value:          EAP CONTENTS
                    Code:           01 = REQUEST
                    Identifier:     00
                    Length:         00 16 = 22 bytes
                    Type:           11 = LEAP CHALLENGE
                    Value:          LEAP CHALLENGE CONTENT
                                    Value:
                                    Version:            01
                                    Not Used:           00
                                    Len. of challenge:  08
                                    Challenge:          5e 2a 84 2a
                                                        a6 4b dd 27
                                    Username:           6c 6c 76 69
                                                        72 61
*****************************************************************************************
```

The AP 102 receives the EAPOL packet with LEAP Challenge Request from the AS 110 and forwards it to the client 106.

NAS —> Client (Forwarding Challenge Request)

```
                                                01  00  00  16  * ...*
01  00  00  16  11  01  00  08  5e  2a  84  2a  a6  4b  dd  27  *........^*.*.K.'*
6c  6c  76  69  72  61                                          *llvira..........*
EAPOL Version:      01
EAPOL Type:         00 = EAP
Length:             00 16 = 22 bytes
EAP Contents:
```

-continued

```
     Code:                01 = REQUEST
     Identifier:          00
     Length:              00 16 = 22 bytes
     Type:                11 = LEAP CHALLENGE
     Value:               LEAP CHALLENGE CONTENT
                          Value:
                          Version:              01
                          Not Used:             00
                          Len. Of challenge:    08
                          Challenge:            5e 2a 84 2a
                                                a6 4b dd 27
                          Username:             6c 6c 76 69
                                                72 61
*************************************************************************************
```

The client 106 receives the RADIUS Challenge Request from the AP 102 and responds to the AP 102 with a LEAP Challenge Response.

```
Client —> NAS (Challenge Response)
                    01  00  00  28  02  00  00  28  11  01  00  18  * ..(...(....*
02  c9  1d  9a  ec  74  75  89  23  9b  f3  e5  ee  f8  de  fa  *.....tu.#.......*
a1  ec  8d  34  c0  db  3c  e3  64  65  6c  6c  76  69  72  61  *...4..<.dellvira*
EAPOL Version:            01
EAPOL Type:               00 = EAP
Length:                   00 28 = 40 bytes
EAP Contents:
     Code:                02 = RESPONSE
     Identifier:          00
     Length:              00 28 = 40 bytes
     Type:                11 = LEAP CHALLENGE
     Value:               LEAP CHALLENGE RESPONSE CONTENT
                          Value:
                          Version:              01
                          Not Used:             00
                          Len. of Challenge:    18
                          Challenge Resp.:      02 c9 1d 9a
                                                ec 74 75 89
                                                23 9b f3 e5
                                                ee f8 de fa
                                                a1 ec 8d 34
                                                c0 db 3c e3
                          Username:             64 65 6c 6c
                                                76 69 72 61
*************************************************************************************
```

The AP 102 receives the LEAP Challenge Response from the client 106, reconstructs the packet for EAPOL, and forwards it to the AS 110 as a RADIUS Access Request with EAP attributes.

```
NAS —> RADIUS (Forwarding Challenge Response)
                                    01  04  00  9f  4a  1c  97  bd  * ...J...*
27  b5  a3  3f  79  49  fe  ea  e4  7d  08  92  01  0a  64  65  *'..?yI...}....de*
6c  6c  76  69  72  61  04  06  c0  a8  82  e4  1e  0e  30  30  *llvira........00*
34  30  39  36  34  37  36  65  63  36  1f  0e  30  30  34  30  *4096476ec6..0040*
39  36  33  35  65  38  65  64  20  11  43  69  73  63  6f  20  *9635e8ed .Cisco *
53  65  63  75  72  65  20  49  49  05  06  00  00  00  1d  0c  *Secure II.......*
06  00  00  05  78  3d  06  00  00  00  13  4f  2a  02  00  00  *....x=.....O*...*
28  11  01  00  18  02  c9  1d  9a  ec  74  75  89  23  9b  f3  *(.........tu.#..*
e5  ee  f8  de  fa  a1  ec  8d  34  c0  db  3c  e3  64  65  6c  *........4..<.del*
6c  76  69  72  61  50  12  cd  d8  1b  2a  ea  4c  47  3a  b4  *lviraP....*.LG:.*
70  43  8f  8b  20  1c  01                                      *pC.. ..........*
RADIUS Code:              01 = REQUEST
Identifier:               03
Length:                   00 9f = 159
Authenticator:            4a 1c 97 bd 27 b5 a3 3f 79 49 fe ea e4 7d 08 92
ATTRIBUTES:
     Type:                01 = User-Name
     Length:              0a = 10
     Value:               "dellvira"
     Type:                04 = NAS-IP-Address
     Length:              06 = 6
     Value:               c0 a8 82 e4
     Type:                1e = Called-ID
     Length:              0e = 14
     Value:               "004096476ec6"
     Type:                1f = Calling-ID
     Length:              0e = 14
     Value:               "00409635e8ed"
     Type:                20 = NAS-ID
     Length:              11 = 17
     Value:               "Cisco Secure II"
     Type:                05 = NAS-Port
     Length:              06 = 6
```

-continued

```
    Value:              1d = 29
    Type:               0c = Framed-MTU
    Length:             06 = 6
    Value:              05 78 = 1400
    Type:               3d = NAS-Port-Type
    Length:             06 = 6
    Value:              00 00 00 13 = Wireless
    Type:               4f = EAP
    Length:             2A = 42
    Value:              EAP CONTENTS
                        Code:                   02 = RESPONSE
                        Identifier:             00
                        Length:                 00 28 = 40 bytes
                        Type:                   11 = LEAP CHALLENGE
                        Value:                  LEAP CHALLENGE RESPONSE CONTENT
                        Value:
                        Version:                01
                        Not Used:               00
                        Len. of Challenge:      18
                        Challenge Resp.:        02 c9 1d 9a
                                                ec 74 75 89
                                                23 9b f3 e5
                                                ee f8 de fa
                                                a1 ec 8d 34
                                                c0 db 3c e3
                        Username:               64 65 6c 6c
                                                76 69 72 61
    Type:               50 = Message Authenticator
    Length:             12 = 18
    Value:              cd d8 1b 2a ea 4c 47 3a b4 70 43 8f 8b 20 1c 01
*************************************************************************************
```

The AS 110 then determines if the access request is valid. If not, the AS 110 sends a deny message with an EAP fail attribute to the AP 102. If valid, the AS 110 sends an access challenge with an EAP success attribute. The trace code for the success scenario is provided hereinbelow.

RADIUS —> NAS (Challenge Request - EAP SUCCESS)

```
                                    02 04 00 3e 77 31 e9 33    * ..>w1.3*
33 c1 31 6f e2 f1 a9 4e e5 58 ce fc 50 12 dc 6a    *3.lo...N.X..P..j*
b8 43 df 24 d7 72 32 80 83 96 9f 1a b2 2b 1b 06    *.C.$.r2......+..*
00 00 00 b4 1c 06 00 00 00 2d 08 06 ff ff ff ff    *.........-......*
4f 06 03 00 00 04                                  *O..............*
RADIUS Code:            02 = ACCEPT (Later version is in a CHALLENGE)
Identifier:             04
Length:                 00 2e
Authenticator:          77 31 e9 33 33 c1 31 6f e2 f1 a9 4e e5 58 ce fc
ATTRIBUTES:
    Type:               50 = Message Authenticator
    Length:             12 = 18
    Value:              dc 6a b8 43 df 24 d7 72 32 80 83 96 9f 1a b2 2b
    Type:               1b = Session Timeout
    Length:             06
    Value:              00 00 00 b4 = 180 seconds
    Type:               1c = Idle Timeout
    Length:             06
    Value:              00 00 00 2d
    Type:               08 = Framed IP Address
    Length:             06
    Value:              ff ff ff ff
    Type:               4f = EAP
    Length:             06 = 6 bytes
    Value:              EAP CONTENTS
                        Code:                   03 = SUCCESS
                        Identifier:             00
                        Length:                 00 04 = 4 bytes
*************************************************************************************
```

The AP 102 receives the RADIUS access-challenge message from the AS 110 as an EAPOL packet with EAP code contents of a success, and forwards it to the client 106.

NAS —> Client (Forwarding EAP-SUCCESS)

```
01 00 00 04 03 00 00 04                            *................*
EAPOL Version:          01
EAPOL Type:             00 = EAP
Length:                 00 04 = 4
EAP Contents:
    Code:               03 = SUCCESS
    Identifier:         00
    Length:             00 04
*************************************************************************************
```

The client 106 receives success message for the AP 102 and initiates its own LEAP Challenge Request to the AS 110 via the AP 102.

-continued

```
Client —> NAS (Challenge Request)
01  00  00  18  01  00  00  18  11  01  00  08  57  8f  c0  65   *............W..e*
1c  ca  e2  8e  64  65  6c  6c  76  69  72  61                   *....dellvira....*
EAPOL Version:          01
EAPOL Type:             00 = EAP
Length:                 00 18 = 24
EAP Contents:
    Code:               01 = REQUEST
    Identifier:         00
    Length:             00 18 = 24 bytes
    Type:               11 = LEAP CHALLENGE
    Value:              LEAP CHALLENGE CONTENT
                            Value:
                            Version:                01
                            Not Used:               00
                            Len of Challenge:       08
                            Challenge:              57 8f c0 65
                                                    1c ca e2 8e
                            Username:               64 65 6c 6c
                                                    76 69 72 61
************************************************************************************
```

The AP 102 in turn forwards the client Challenge Request to the AS 110 as a RADIUS request with EAP attributes.

```
NAS —> RADIUS (Challenge Request)
                                            01  05  00  8f  9d  03  10  d1   * .......*
0b  4a  43  d9  67  9e  86  84  05  78  8e  f0  01  0a  64  65   *.JC.g....x....de*
6c  6c  76  69  72  61  04  06  c0  a8  82  e4  1e  0e  30  30   *llvira........00*
34  30  39  36  34  37  36  65  63  36  1f  0e  30  30  34  30   *4096476ec6..0040*
39  36  33  35  65  38  65  64  20  11  43  69  73  63  6f  20   *9635e8ed .Cisco *
53  65  63  75  72  65  20  49  49  05  06  00  00  00  1d  0c   *Secure II.......*
06  00  00  05  78  3d  06  00  00  00  13  4f  1a  01  00  00   *....x=.....O....*
18  11  01  00  08  57  8f  c0  65  1c  ca  e2  8e  64  65  6c   *.....W..e....del*
6c  76  69  72  61  50  12  54  7b  09  1b  6b  68  61  79  ec   *lviraP.T{..khay.*
b0  7b  21  34  20  bf  40                                       *.{!4 .@.........*
RADIUS Code:            01 = Request
Identifier:             05
Length:                 00 8f = 143
Authenticator:          9d 03 10 d1 0b 4a 43 d9 67 9e 86 84 05 78 8e f0
ATTRIBUTES:
    Type:               01 = User-Name
    Length:             0a = 10
    Value:              "dellvira"
    Type:               04 = NAS-IP-Address
    Length:             06 = 6
    Value:              c0 a8 82 e4
    Type:               1e = Called-ID
    Length:             0e = 14
    Value:              "004096476ec6"
    Type:               1f = Calling-ID
    Length:             0e = 14
    Value:              "00409635e8ed"
    Type:               20 = NAS-ID
    Length:             11 = 17
    Value:              "Cisco Secure II"
    Type:               05 = NAS-Port
    Length:             06 = 6
    Value:              1d = 29
    Type:               0c = Framed-MTU
    Length:             06 = 6
    Value:              05 78 = 1400
    Type:               3d = NAS-Port-Type
    Length:             06 = 6
    Value:              00 00 00 13 = Wireless
    Type:               4f = EAP
    Length:             1A = 26
    Value:              EAP CONTENTS
                        Code:                   01 = CHALLENGE
                        Identifier:             00
                        Length:                 00 18 = 24 bytes
                        Type:                   11 = LEAP CHALLENGE
                        Value:                  LEAP CHALLENGE CONTENT
                            Value:
                            Version:            01
                            Not Used:           00
                            Len of Challenge:   08
                            Challenge:          57 8f c0 65
                                                1c ca e2 8e
                            Username:           64 65 6c 6c
                                                76 69 72 61
```

-continued

```
    Type:              50 = Message Authenticator
    Length:            12 = 18
    Value:             54 7b 09 1b 6b 68 61 79 ec b0 7b 21 34 20 bf 40
*************************************************************************************
```

The AS 110 responds to the AP 102 with an access-accept message with EAP attributes containing a LEAP client Challenge Response and special attributes containing the session and cell multicast keys.

RADIUS —> NAS (ACCEPT with Challenge Response, with special vendor Key)

```
                                02 05 00 9d 7f 89 6a 4d  * .....jM*
c3 ac 4e 37 78 b6 61 5e 84 db 11 d7 50 12 e2 8a  *..N7x.a^....P...*
49 af cb b2 2a ae 0e e8 71 42 9f c8 88 ff 1b 06  *I...*...qB......*
00 00 00 b4 1c 06 00 00 00 2d 08 06 ff ff ff ff  *.........–......*
4f 2a 02 00 00 28 11 01 00 18 89 e2 a2 70 f3 d0  *O*...(.......p..*
36 5c e4 81 2b cd 11 47 9c b1 82 c2 c0 04 36 d1  *6\..+..G......6.*
67 23 64 65 6c 6c 76 69 72 61 1a 3b 00 00 00 09  *g#dellvira.;....*
01 35 6c 65 61 70 3a 73 65 73 73 69 6f 6e 2d 6b  *.5leap:session-k*
65 79 3d 2c 11 78 b6 0c 79 83 90 be d4 79 54 a0  *ey=,.x..y....yT.*
3b 23 9e ab 8a b3 f2 7d 8d 24 cf 62 cd d2 89 f3  *;#.....}.$.b....*
d6 e9 91 b4 9d                                   *................*
RADIUS Code:           02 = ACCEPT
Identifier:            05
Length:                00 9d
Authenticator:         7f 89 6a 4d c3 ac 4e 37 78 b6 61 5e 84 db 11 d7
ATTRIBUTES:
    Type:              50 = Message Authenticator
    Length:            12 = 18
    Value:             e2 8a 49 af cb b2 2a ae 0e e8 71 42 9f c8 88
    Type:              1b = Session Timeout
    Length:            06
    Value:             00 00 00 b4 = 180 seconds
    Type:              1c = Idle Timeout
    Length:            06
    Value:             00 00 00 2d
    Type:              08 = Framed IP Address
    Length:            06
    Value:             ff ff ff ff
    Type:              4f = EAP
    Length:            2A = 42
    Value:             EAP CONTENTS
                       Code:                02 = RESPONSE
                       Identifier:          00
                       Length:              00 28 = 40 bytes
                       Type:                11 = LEAP CHALLENGE
                       Value:               LEAP CHALLENGE RESPONSE CONTENT
                       Value:
                       Version:                01
                       Not Used:               00
                       Len of Challenge:       18
                       Challenge Resp.:        89 e2 a2 70
                                               f3 d0 36 5c
                                               e4 81 2b cd
                                               11 47 9c b1
                                               82 c2 c0 04
                                               36 d1 67 23
                       Username:            64 65 6c 6c 76 69 72 61
                       Type:                1a = Vendor
                       Length:              3b = 59
                       Value:               00 00 00 09 = Cisco
                           Type:               01 = Send-key
                           Length:             35 = 53
                           Value:              Reference to RFC 2548
                                               AV pair identifier
                                               "leap:session-key="
                                               6c 65 61 70 3a 73 65 73
                                               73 69 6f 6e 2d 6b 65 79
                                               3d
                                               Salt for encryption routine
                                               2c 11
                                               Encrypted block
                                               1 byte length
                                               16 bytes of encrypted key
                                               15 bytes of padding
                                               78 b6 0c 79 83 90 be d4
                                               79 54 a0 3b 23 9e ab 8a
                                               b3 f2 7d 8d 24 cf 62 cd
                                               d2 89 f3 d6 e9 91 b4 9d
*************************************************************************************
```

The AP 102 receives from the AS 110 the EAPOL packet with LEAP client Challenge Response, and forwards the Response to the client 106.

-continued

```
RADIUS: Sending EAPOL packet to client
                                                01  00  00  28  * ..(*
02  00  00  28  11  01  00  18  89  e2  a2  70  f3  d0  36  5c  *...(.......p..6\*
e4  81  2b  cd  11  47  9c  b1  82  c2  c0  04  36  d1  67  23  *..+..G......6.g#*
64  65  6c  6c  76  69  72  61                                  *dellvira........*
EAPOL Version:          01
EAPOL Type:             00 = EAP
Length:                 00 28 = 40 bytes
EAP Contents:
    Code:               02 = RESPONSE
    Identifier:         00
    Length:             00 28 = 40 bytes
    Type:               11 = LEAP CHALLENGE
    Value:              LEAP CHALLENGE RESPONSE CONTENT
                        Value:
                        Version:            01
                        Not Used:           00
                        Len. of Challenge:  18
                        Challenge Resp.:    89 e2 a2 70
                                            f3 d0 36 5c
                                            e4 81 2b cd
                                            11 47 9c b1
                                            82 c2 c0 04
                                            36 d1 67 23
                        Username:           64 65 6c 6c 76 69 72 61
*************************************************************************************
    The AP 102 sends to the client 106 an EAPOL-KEY packet with a cell multicast
key.
NAS —> Client (EAPOL-KEY Multicast Key)
                    01  03  00  39  01  00  0d  00  00  00  00  00  * ..9........*
3b  00  01  60  44  77  8b  72  25  4d  6b  6f  56  37  a0  49  *;..`Dw.r%MkoV7.I*
d8  1a  b1  00  32  51  12  ab  e2  99  5b  a5  36  15  32  6d  *....2Q....[.6.2m*
f3  e6  3a  4d  b4  be  71  2e  d3  e3  0b  1c  d6  99  07  64  *..:M..q........d*
7a                                                              *z...............*
EAPOL Version:          01
EAPOL Type:             03 = EAPOL-KEY
Length:                 00 39 = 57 bytes
Descriptor Type:        01 = RC4
Key Length:             00 0d = 13
Replay:                 00 00 00 00 00 3b 00 01
Key Vector:             60 44 77 8b 72 25 4d 6b 6f 56 37 a0 49 d8 1a b1
Key Index:              00
Key Signature:          32 51 12 ab e2 99 5b a5 36 15 32 6d f3 e6 3a 4d
Key:                    b4 be 71 2e d3 e3 0b 1c d6 99 07 64 7a
*************************************************************************************
    The AP 102 sends to the client 106 an EAPOL-KEY packet with session
parameters including the session ID and key length.
RADIUS: Sending EAPOL session key parameters
01  03  00  2c  01  00  0d  00  00  00  00  00  3b  00  02  4e  *...,........;..N*
d0  4f  31  35  65  1e  e2  0a  f1  54  c8  00  e3  57  45  83  *.O15e....T...WE.*
a1  3b  19  01  60  4c  3d  05  26  1d  e6  9d  82  49  47  f7  *.;..`L=.&....IG.*
EAPOL Version:          01
EAPOL Type:             03 = EAPOL-KEY
Length:                 00 2c = 44 bytes
Descriptor Type:        01 = RC4
Key Length:             00 0d = 13
Replay:                 00 00 00 00 00 3b 00 02
Key Vector:             4e d0 4f 31 35 65 1e e2 0a f1 54 c8 00 e3 57 45
Key Index:              83 = LEAP Session Key (Index 3)
Key Signature:          a1 3b 19 01 60 4c 3d 05 26 1d e6 9d 82 49 47 f7
Key:
```

The client 106 then installs the keys, and the AP 102 unblocks all packet traffic to and from the client 106.

Figure 7:
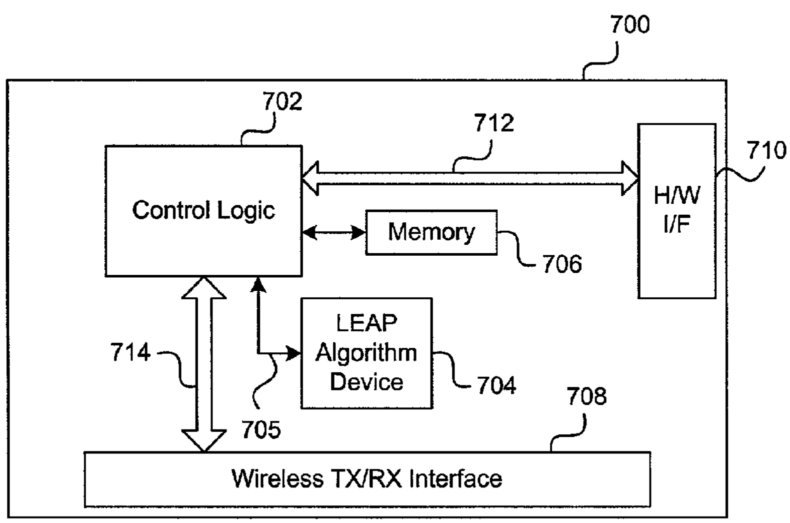
FIG. 7 illustrates a block diagram of a hardware network interface device incorporating the LEAP algorithm for use in a wireless client that communicates with an access point, in accordance with a disclosed embodiment.

Referring now to FIG. 7, there is illustrated a block diagram of a hardware network interface device 700 incorporating the LEAP algorithm for use in a wireless client that communicates with the AP 102, in accordance with a disclosed embodiment. The interface device 700 (similar to client interface 206, AP interface 200, and AS 110 interface 212) comprises control logic 702 for controlling onboard functions. For example, the control logic 702 operatively connects to algorithm logic 704 via an algorithm interconnect 705 such as a Field Programmable Gate Array (FPGA) device that contains the disclosed LEAP algorithm encoded therein. Alternatively, the algorithm logic 704 can be a non-volatile architecture (e.g., EEPROM) such that the algorithm is stored therein and uploaded to the control logic 702 for high-speed execution under normal operating conditions. The network interface device 700 includes a memory 706 operatively connected to the control logic 702 for providing information exchange and storage during normal operation of the interface device 700. The memory 706 is suitably that which conforms to the speed and architecture requirements of the control logic 702 (e.g., flash memory), and the form factor of the interface device 700. It is appreciated that the memory 706 and the algorithm device 704 may be separately or both designed into the control logic 702.

The network interface device 700 also comprises a wireless (or wired) transmit/receive interface 708 for communicating wirelessly to the AP 102 in accordance with the IEEE 802.11 and IEEE 802.1x protocols, and according to the disclosed LEAP algorithm. The interface device 700 also comprises a hardware interconnect interface 710 for providing power and communication signals between the network interface device 700 and the wireless client device 110 in which it is utilized. The control logic 702 connects to the hardware interconnect 710 over a hardware interface bus 712. The control logic 702 communicates with the transmit/receive interface 708 over a bus pathway 714 to facilitate communication of EAP and LEAP packets to and from the AP 102.

Note that the interface device 700 may be a PC Card (i.e., a card conforming to an earlier PCMCIA standard) that is inserted into a proprietary slot of, for example, a notebook (or laptop) computer. Alternatively, the interface device 700 incorporates the disclosed novel features and conforms to the CardBus standard. Further, the interface device 700 may be designed into a motherboard of the wireless device 110, such that a single control logic 702 (or processor) handles all board motherboard functions including communication interfacing to the AP 102.

The type of wireless client 106 suitable to include the disclosed algorithm includes, but is not limited to, for example, a portable handheld device with the interface device 700, a desktop computer having the wireless interface device 700 that conforms to a PCI standard, and a portable electronic tablet (e.g., PDA, etc.).

LEAP is just one type of authentication that can run above EAP. Another is EAP- TLS (EAP-Transport Level Security). EAP-TLS provides for mutual authentication, and integrity-protected ciphersuite negotiation and key exchange between two endpoints. The EAP-TLS conversation will typically begin with the authenticator and the peer negotiating EAP. The authenticator will then send an EAP-Request/Identity packet to the peer, and the peer will respond with an EAP-Response/Identity packet to the authenticator, containing the peer user ID. From this point forward, while nominally the EAP conversation occurs between the PPP authenticator and the peer, the authenticator may act as a pass-through device, with the EAP packets received from the peer being encapsulated for transmission to the RADIUS server or backend security server. Further description of EAP-TLS can be obtained from sources commonly known to one skilled in the art.

Although the preferred embodiment has been described in detail, it should be understood that various changes, substitutions and alterations could be made therein without departing from the spirit and scope of the invention as defined by the appended claims.

What is claimed is:

1. A method of managing access to a network, comprising the steps of:

providing a challenge-handshake protocol within an Extensible Authentication Protocol for authentication between a client and the network; and deriving a network session key and a client session key, whereafter successful authentication of both the client to the network and the network to the client, the network session key is used to both create a packet signature and to encrypt a key value of a multicast key that is transmitted from the network to the client.

2. The method of claim 1, wherein the challenge-handshake protocol in the step of providing is a CHAP (Challenge-Handshake Authentication Protocol).

3. The method of claim 1, wherein authentication in the step of providing is performed mutually between the client and the network.

4. The method of claim 1, wherein the challenge-handshake protocol comprises the step of mutually authenticating a client and the network in response to a single sign-on by a user of the client.

5. The method of claim 1, wherein the challenge-handshake protocol in the step of providing facilitates authentication between the network and the client, which client is a wireless client.

6. The method of claim 1, wherein the challenge-handshake protocol in the step of providing facilitates authentication between the network and the client, which client is a wired client.

7. The method of claim 1, wherein the client session key is derived independently of the network session key, which both the network session key and the client session key are utilized for enabling secure communications between the client and the network.

8. The method of claim 7, wherein the network session key is derived from a username of a user input to the client and transmitted to the network.

9. The method of claim 1, wherein the challenge-handshake protocol in the step of providing is utilized between an authentication server disposed on the network and the client, the authentication server performing an authentication of the client, followed by the client performing an authentication of the network.

10. The method of claim 1, wherein the network includes an authentication server disposed thereon for providing authentication services and a network access server disposed thereon for providing communications between the client and the authentication server, whereafter successful mutual authentication between the authentication server and the client, the authentication server passes a session key to the network access server utilizing vendor-specific attribute data.

11. The method of claim 1, wherein the client is a wireless client including a network interface device, the network interface device adapted to host the challenge-handshake protocol utilized for authentication between the wireless client and the network.

12. A method of managing access to a network, comprising the steps of:

providing a challenge-handshake protocol within an Extensible Authentication Protocol for authentication between a client and the network;

wherein the network includes an authentication server disposed thereon for providing authentication services and a network access server disposed thereon for providing communications between the client and the authentication server, whereafter successful mutual authentication between the authentication server and the client, the authentication server passes a session key to the network access server utilizing vendor-specific attribute data.

13. The method of claim 12, wherein the challenge-handshake protocol in the step of providing is a CHAP (Challenge-Handshake Authentication Protocol).

14. The method of claim 12, wherein the challenge-handshake protocol comprises the step of mutually authenticating a client and the network in response to a single sign-on by a user of the client.

15. The method of claim 12, wherein the challenge-handshake protocol in the step of providing facilitates authentication between the network and the client, which client is a wireless client.

16. The method of claim 12, wherein the challenge-handshake protocol in the step of providing facilitates authentication between the network and the client, which client is a wired client.

17. The method of claim 12, wherein the challenge-handshake protocol in the step of providing is utilized between an authentication server disposed on the network and the client, the authentication server performing an authentication of the client, followed by the client performing an authentication of the network.

18. The method of claim 12, wherein the vendor-specific attribute data is indicative of an enctyption key value.

19. The method of claim 18, further comprising extracting the encryption key value by the network access server.

20. The method of claim 19, further comprising sending an encrypted message by the network access server to the client, the encrypted message indicating to the client a key length and key index of the session key.

21. The method of claim 20, further comprising, sending a second message by the network access server to the client, the second encrypted message comprising the key length, key index, and a value of a multicast key.

22. A system of managing access to a network, comprising:

an authentication server disposed on the network to provide an authentication service; and a network access server disposed on the network in communication with a client seeking access to the network;

wherein the authentication server and the client are adapted to communicate utilizing a challenge-handshake protocol within an Extensible Authentication Protocol for authentication of the client and the authentication server; and wherein a network session key and a client session key are derived, whereafter successful authentication of both the client to the network and the network to the client, the network session key is used to both create a packet signature and to encrypt a key value of a multicast key that is transmitted from the network access server to the client.

23. The system of claim 22, wherein the challenge-handshake protocol is a CHAP (Challenge-Handshake Authentication Protocol).

24. The system of claim 22, wherein the challenge-handshake protocol is utilized to mutual authenticate the client and the authentication server in response to a single sign-on by a user of the client.

25. The system of claim 22, wherein the challenge handshake protocol facilitates authentication between the network and the client, which is a wireless client.

26. The system of claim 22, wherein the challenge-handshake protocol facilitates authentication between the network and the client, which client is a wired client.

27. The system of claim 22, wherein the network session key is derived from a username of a user input to the client and transmitted to the authentication server.

28. The system of claim 22, wherein the authentication server performs an authentication of the client, followed by the client performing an authentication of the authentication server.

29. The system of claim 22, wherein after successful mutual authentication between the authentication server and the client, the authentication server passes a session key to the network access server utilizing vendor-specific attribute data.

30. The system of claim 22, wherein the client is a wireless client including a network interface device, the network interface device adapted to host the challenge-handshake protocol utilized for authentication between the wireless client and the network.

31. The system of claim 22, wherein the network access server is a network switch adapted to facilitate communication between the authentication server and the client, which client is a wired client.

32. A system of managing access to a network, comprising:

an authentication server disposed on the network to provide an authentication service; and a network access server disposed on the network in communication with a client seeking access to the network;

wherein the authentication server and the client are adapted to communicate utilizing a challenge-handshake protocol within an Extensible Authentication Protocol for authentication of the client and the authentication server; and wherein after successful mutual authentication between the authentication server and the client, the authentication server passes a session key to the network access server utilizing vendor-specific attribute data.

33. The system of claim 32, wherein the challenge-handshake protocol is a CHAP (Challenge-Handshake Authentication Protocol).

34. The system of claim 32, wherein the challenge-handshake protocol is utilized to mutual authenticate the client and the authentication server in response to a single sign-on by a user of the client.

35. The system of claim 32, wherein the challenge-handshake protocol facilitates authentication between the network and the client, which is a wireless client.

36. The system of claim 32, wherein the challenge-handshake protocol facilitates authentication between the network and the client, which client is a wired client.

37. The system of claim 32, wherein a session key is derived for enabling secure communications between the client and the network access server.

38. The system of claim 32, wherein a network session key and a client session key are derived, which client session key is derived independently of the network session key, which both the network session key and the client session key are utilized for enabling secure communications between the client and the network access server.

39. The system of claim 38, wherein the network session key is derived from a username of a user input to the client and transmitted to the authentication server.

40. The system of claim 32, wherein the authentication server performs an authentication of the client, followed by the client performing an authentication of the authentication server.

41. The system of claim 32, wherein a network session key and a client session key are derived, whereafter successful authentication of both the client to the network and the network to the client the network session key is used to both create a packet signature and to encrypt a key value of a multicast key that is transmitted from the network access server to the client.

42. A system according to claim 32, wherein the vendor-specific attribute data is indicative of an encryption key value.

43. A system according to claim 42, wherein the network access server extracts the encryption key value by the network access server.

44. A system according to claim 43, wherein the network access server responsive to extracting the encryption key value sends an encrypted message to the client, the encrypted message indicating to the client a key length and key index of the session key.

45. A system according to claim 44, wherein the network access server is responsive to extracting the encryption key value to send a second message to the client, the second encrypted message comprising the key length, key index, and a value of a multicast key.

46. The system of claim 32, wherein the client is a wireless client including a network interface device, the network interface device adapted to host the challenge-handshake protocol utilized for authentication between the wireless client and the network.

47. The system of claim 32, wherein the network access server is a network switch adapted to facilitate communication between the authentication server and the client, which client is a wired client.

* * * * *